(12) United States Patent
Hamagishi et al.

(10) Patent No.: US 7,492,514 B2
(45) Date of Patent: *Feb. 17, 2009

(54) STEREOSCOPIC IMAGE DISPLAY WITH VERTICAL AND LATERAL ARRANGEMENTS

(75) Inventors: Goro Hamagishi, Toyonaka (JP); Satoshi Takemoto, Ogaki (JP)

(73) Assignee: Epson Imaging Devices Corporation, Tokyo (JP)

( * ) Notice: Subject to any disclaimer, the term of this patent is extended or adjusted under 35 U.S.C. 154(b) by 292 days.

This patent is subject to a terminal disclaimer.

(21) Appl. No.: 11/393,868

(22) Filed: Mar. 31, 2006

(65) Prior Publication Data

US 2006/0227256 A1     Oct. 12, 2006

(30) Foreign Application Priority Data

Mar. 31, 2005   (JP) .............................. 2005-100407

(51) Int. Cl.
     *G02B 27/26*   (2006.01)
(52) U.S. Cl. ............................ 359/465; 348/58; 349/15
(58) Field of Classification Search .......... 359/462–465
     See application file for complete search history.

(56) References Cited

U.S. PATENT DOCUMENTS

| 5,410,345 A | * | 4/1995 | Eichenlaub | ................. 348/59 |
| 6,049,424 A |   | 4/2000 | Hamagishi | |
| 7,250,923 B2 |   | 7/2007 | Taira et al. | |
| 2005/0062905 A1 |   | 3/2005 | Kim et al. | |
| 2006/0082519 A1 | * | 4/2006 | Nam et al. | ...................... 345/9 |
| 2006/0126177 A1 | * | 6/2006 | Kim et al. | ................... 359/465 |
| 2006/0268185 A1 | * | 11/2006 | Hamagishi et al. | ............ 349/15 |

FOREIGN PATENT DOCUMENTS

| DE | 20022456 U1 | * | 10/2001 |
| EP | 0 833 183 | | 4/1998 |
| JP | 3-119889 A | | 5/1991 |
| JP | 2857429 | | 11/1998 |
| JP | 2004-258631 | | 9/2004 |
| WO | WO 2005/006774 | | 1/2005 |

OTHER PUBLICATIONS

Extended European Search Report dated Jun. 22, 2006.

* cited by examiner

*Primary Examiner*—Lee Fineman
(74) *Attorney, Agent, or Firm*—McDermott Will & Emery LLP

(57) ABSTRACT

An image display provides a stereoscopic image to an observer by advancing either light having a first polarization axis or light having a second polarization axis toward the eyes of the observer while arranging a prescribed reference side of a display panel in a first direction, and provides another stereoscopic image to the observer by advancing either light having a third polarization axis or light having a fourth polarization axis toward the eyes of the observer while arranging the prescribed reference side of the display panel in a second direction intersecting with the first direction.

18 Claims, 11 Drawing Sheets

VERTICAL ARRANGEMENT

VERTICAL ARRANGEMENT

LATERAL ARRANGEMENT

LATERAL ARRANGEMENT

VERTICAL ARRANGEMENT

LATERAL ARRANGEMENT

VERTICAL ARRANGEMENT

STEREOSCOPIC IMAGE DISPLAY MODE IN LATERAL ARRANGEMENT

VERTICAL ARRANGEMENT

LATERAL ARRANGEMENT

VERTICAL ARRANGEMENT

VERTICAL ARRANGEMENT

VERTICAL ARRANGEMENT

VERTICAL ARRANGEMENT

STEREOSCOPIC IMAGE DISPLAY WITH VERTICAL AND LATERAL ARRANGEMENTS

BACKGROUND OF THE INVENTION

1. Field of the Invention

The present invention relates to an image display, and more particularly, it relates to an image display capable of displaying stereoscopic images.

CROSS-REFERENCE TO RELATED APPLICATIONS

The priority application number JP2005-100407 upon which this patent application is based is hereby incorporated by reference.

2. Description of the Background Art

For example, Japanese Patent No. 2857429 discloses a conventional three-dimensional image display capable of displaying three-dimensional stereoscopic images.

The three-dimensional image display disclosed in the aforementioned Japanese Patent No. 2857429 can form openings and shields of prescribed shapes on prescribed positions of an electronic parallax barrier arranged on a side of an image display surface closer to an observer in the form of stripes substantially perpendicularly to a line segment connecting the left and right eyes of the observer with each other by controlling the electronic parallax barrier with control means such as a microcomputer. In order to provide three-dimensional images to the observer, the three-dimensional image display disclosed in Japanese Patent No. 2857429 forms the openings of the electronic parallax barrier to introduce left- and right-eye images into the left and right eyes of the observer respectively.

A stereoscopic image display capable of presenting stereoscopic images to an observer by arranging a barrier provided with slitlike openings and shields on a side of a display panel closer to the observer is also proposed in general. FIG. 17 is a plan view for illustrating the principle of an exemplary conventional stereoscopic image display 500. The structure of the conventional stereoscopic image display 500 is now described with reference to FIG. 17.

As shown in FIG. 17, the conventional stereoscopic image display 500 comprises a display panel 501 for displaying images, a polarizing plate 502 arranged on a side of the display panel 501 closer to an observer 510 and a barrier 503 provided on a side of the polarizing plate 502 closer to the observer 510.

The display panel 501 has a glass substrate 501a. Further, the display panel 501 is alternately provided with pixel trains 501b and 501c extending in a direction (perpendicular to the plane of FIG. 17) substantially perpendicular to a line segment connecting the left and right eyes 510a and 510b of the observer 510 with each other. The image display 500 displays images L10 and R10 to be observed by the observer 510 with the left and right eyes 510a and 510b on the pixel trains 501b and 501c respectively.

The barrier 503 is provided with shields 503a and openings 503b for blocking and transmitting light emitted from the display panel 501 respectively. The shields 503a and the openings 503b are alternately provided to extend in the direction (perpendicular to the plane of FIG. 17) substantially perpendicular to the line segment connecting the left and right eyes 510a and 510b of the observer 510 with each other, similarly to the pixel trains 501b and 501c of the display panel 501. The shields 503a and the openings 503b are provided in correspondence to sets of the pixel trains 501b and 501c of the display panel 501 respectively.

A stereoscopic image display method according to the conventional stereoscopic image display 500 is now described with reference to FIG. 17.

When observing the display panel 501 of the conventional stereoscopic image display 500 through the openings 503b of the barrier 503, the observer 510 receives the images L10 and R10 displayed on the pixel trains 501b and 501c of the display panel 501 in the left and right eyes 510a and 510b respectively. Thus, the observer 510 can observe stereoscopic images.

However, the conventional stereoscopic image display 500 shown in FIG. 17 provides stereoscopic images to the observer 510 only when the same is vertically arranged, for example. Therefore, when the stereoscopic image display 500 is laterally arranged, for example, it is disadvantageously difficult to provide stereoscopic images to the observer 510.

The aforementioned Japanese Patent No. 2857429 also has a similar problem.

SUMMARY OF THE INVENTION

The present invention has been proposed in order to solve the aforementioned problem, and an object of the present invention is to provide an image display capable of providing stereoscopic images to an observer in both of vertical arrangement and lateral arrangement.

In order to attain the aforementioned object, an image display according to an aspect of the present invention comprises a display panel for displaying images, a light source for applying light toward the display panel, first polarization axis control means for separating the light irradiated from the light source into light having a first polarization axis and another light having a second polarization axis and second polarization axis control means for separating the light irradiated from the light source into still another light having a third polarization axis and further light having a fourth polarization axis, for providing a stereoscopic image to an observer by advancing either the light having the first polarization axis or the light having the second polarization axis toward the eyes of the observer while arranging a prescribed reference side of the display panel in a first direction and providing another stereoscopic image to the observer by advancing either the light having the third polarization axis or the light having the fourth polarization axis toward the eyes of the observer while arranging the prescribed reference side of the display panel in a second direction intersecting with the first direction.

According to this aspect, as hereinabove described, the image display provided with the first polarization axis control means and the second polarization axis control means can provide stereoscopic images to the observer in both cases of arranging the display panel in the first direction (vertical direction) and the second direction (lateral direction) by advancing either the light having the first polarization axis or the light having the second polarization axis irradiated from the light source and separated by the first polarization axis control means while arranging the prescribed reference side in the first direction and advancing either the light having the third polarization axis or the light having the fourth polarization axis irradiated from the light source and separated by the second polarization axis control means while arranging the prescribed reference side of the display panel in the second direction intersecting with the first direction.

The image display according to the aforementioned aspect preferably provides a stereoscopic image to the observer by advancing a left-eye image toward the left eye of the observer and advancing a right-eye image toward the right eye of the observer with either the light having the first polarization axis or the light having the second polarization axis while arranging the prescribed reference side of the display panel in the first direction, and provides another stereoscopic image to the observer by advancing the left-eye image toward the left eye of the observer and advancing the right-eye image toward the right eye of the observer with either the light having the third polarization axis or the light having the fourth polarization axis while arranging the prescribed reference side of the display panel in the second direction intersecting with the first direction. According to this structure, the image display can easily provide stereoscopic images in both cases of arranging the display panel in the first direction (vertical direction) and the second direction (lateral direction).

In the image display according to the aforementioned aspect, the first polarization axis control means preferably includes a plurality of first polarization control areas for controlling the light irradiated from the light source to the light having the first polarization axis and a plurality of second polarization control areas for controlling the light irradiated from the light source to the light having the second polarization axis, and the plurality of first polarization control areas and the plurality of second polarization areas are preferably arranged to extend along a third direction intersecting with both of the first direction and the second direction while the prescribed reference side of the display panel is arranged in the first direction. According to this structure, the image display, capable of advancing either the light having the first polarization axis or the light having the second polarization axis toward the eyes of the observer in a state substantially uniformly dispersed in vertical and lateral directions, can disperse reduction of the resolution of images displayed on the display panel in the vertical and lateral directions. Thus, the image display can provide stereoscopic images having small image deterioration to the observer.

In the aforementioned image display having the first polarization axis control means including the first polarization control areas and the second polarization control areas, the plurality of first polarization control areas and the plurality of second polarization areas are preferably arranged stepwise while the prescribed reference side of the display panel is arranged in the first direction. According to this structure, the plurality of first polarization control areas and the plurality of second polarization control areas can be easily obliquely arranged.

In the aforementioned image display having the first polarization axis control means including the first polarization control areas and the second polarization control areas, the display panel preferably includes a plurality of dot areas for displaying the three primary colors of light, and the first polarization control areas and the second polarization control areas of the first polarization axis control means are preferably arranged for the respective dot areas of the display panel. According to this structure, the image display can introduce images displayed on the display panel into the eyes of the observer in a subdivided state through the first and second polarization control areas provided for the respective dot areas. Thus, the image display can provide stereoscopic images having less image deterioration to the observer.

In the image display according to the aforementioned aspect, the first polarization axis control means preferably includes a retardation plate. When employing the retardation plate, the image display can easily separate the light irradiated from the light source into the light having the first polarization axis and the light having the second polarization axis.

In the image display according to the aforementioned aspect, the second polarization axis control means preferably includes a plurality of third polarization control areas for controlling the light irradiated from the light source to the light having the third polarization axis and a plurality of fourth polarization control areas for controlling the light irradiated from the light source to the light having the fourth polarization axis, and the third polarization control areas and the fourth polarization control areas are preferably alternately arranged in a direction along a direction connecting the left and right eyes of the observer with each other to extend substantially perpendicularly to the direction connecting the left and right eyes of the observer with each other while the prescribed reference side of the display panel is arranged in the second direction. According to this structure, the image display, capable of easily advancing either the light having the third polarization axis or the light having the fourth polarization axis toward the eyes of the observer through the third and fourth polarization control areas extending substantially perpendicularly to the direction connecting the left and right eyes of the observer with each other while arranging the prescribed reference side of the display panel in the second direction, can easily provide stereoscopic images to the observer while arranging the prescribed reference side of the display panel in the second direction.

In the aforementioned image display having the second polarization axis control means including the third polarization control areas and the fourth polarization control areas, the display panel preferably includes three types of dot areas for displaying the three primary colors of light respectively, the lengths of the third polarization control areas and the fourth polarization control areas of the second polarization axis control means in the direction along the direction connecting the left and right eyes of the observer with each other are preferably set to substantially correspond to the lengths of the dot areas in the direction along the direction connecting the left and right eyes of the observer with each other, and the three types of dot areas of the display panel for displaying the three primary colors of light respectively are preferably adjacently arranged substantially perpendicularly to the direction connecting the left and right eyes of the observer with each other while the display panel is arranged in the second direction. According to this structure, the three types of dot areas corresponding to the three primary colors of light respectively can be arranged on the third and fourth polarization control areas provided to extend substantially perpendicularly to the direction connecting the left and right eyes of the observer with each other, whereby the image display can provide stereoscopic images having small image deterioration to the observer.

In the aforementioned image display having the second polarization axis control means including the third polarization control areas and the fourth polarization control areas, the second polarization axis control means preferably includes a first polarization control liquid crystal panel having the third polarization control areas and the fourth polarization control areas, and the third polarization control areas and the fourth polarization control areas of the first polarization control liquid crystal panel are preferably formed with electrodes for applying voltage to liquid crystals, to extend in the same direction as the third polarization control areas and the fourth polarization control areas respectively. According to this structure, the image display, capable of applying voltage to liquid crystals of the third and fourth polarization control areas through the electrodes of the first polarization control liquid crystal panel, can easily change polarization control states of the third and fourth polarization control areas by controlling a state of applying the voltage to the liquid crystals. Thus, the image display can perform polarization control only when arranging the prescribed reference side of the display panel in the second direction.

The image display according to the aforementioned aspect preferably further comprises third polarization axis control means controlling the light having the first polarization axis to light having a fifth polarization axis and controlling the light having the second polarization axis to another light having a sixth polarization axis while the prescribed reference side of the display panel is arranged in the first direction and transmitting the light having the first polarization axis and the light having the second polarization axis without controlling the polarization axes while the prescribed reference side of the display panel is arranged in the second direction. According to this structure, the image display can perform polarization control only when arranging the prescribed reference side of the display panel in the first direction while performing no polarization control when arranging the prescribed reference side of the display panel in the second direction through the third polarization axis control means.

In the aforementioned image display comprising the third polarization axis control means, the third polarization axis control means preferably includes a second polarization control liquid crystal panel capable of switching a first state of controlling the light having the first polarization axis to the light having the fifth polarization axis while controlling the light having the second polarization axis to the light having the sixth polarization axis and a second state of transmitting the light having the first polarization axis and the light having the second polarization axis without controlling the polarization axes. According to this structure, the image display, capable of switching the aforementioned first and second states in response to the cases of arranging the prescribed reference side of the display panel in the first and second directions respectively through the second polarization control liquid crystal panel, can easily switch performance and nonperformance of polarization control in response to the state of arrangement of the display panel.

In the aforementioned image display having the third polarization axis control means including the second polarization control liquid crystal panel, the second polarization control liquid crystal panel preferably switches the first state and the second state by controlling a voltage application state. According to this structure, the image display, capable of easily switching the first and second states through the second polarization control liquid crystal panel, can more easily switch performance and nonperformance of polarization control in response to the state of arrangement of the display panel.

In the aforementioned image display comprising the third polarization axis control means, the third polarization axis control means is preferably arranged between the first polarization axis control means and the observer. According to this structure, the image display can easily control the light having the first polarization axis to the light having the fifth polarization axis and control the light having the second polarization axis to the light having the sixth polarization axis.

The aforementioned image display comprising the third polarization axis control means preferably further comprises a first polarizing plate arranged between the third polarization axis control means and the observer for blocking either the light having the fifth polarization axis or the light having the sixth polarization axis controlled by the third polarization axis control means. According to this structure, the image display, capable of easily blocking either the light having the fifth polarization axis or the light having the sixth polarization axis, can easily advance only either the light having the fifth polarization axis or the light having the sixth polarization axis toward the eyes of the observer.

In the image display according to the aforementioned aspect, the first polarization axis control means and the second polarization axis control means are preferably arranged to hold the display panel therebetween. According to this structure, the image display, capable of reducing the interval between the display panel and the first polarization axis control means as compared with a case of arranging the second polarization axis control means between the display panel and the first polarization axis control means, for example, can reduce a proper visual range with reference to the display panel. When applied to a portable telephone or the like having a small display panel, therefore, the inventive image display, capable of reducing the distance (proper visual range) between the display panel and the eyes of the observer, can render stereoscopic images displayed on the display panel easy to observe.

The image display according to the aforementioned aspect preferably further comprises a second polarizing plate arranged between the second polarization axis control means and the display panel for blocking either the light having the third polarization axis or the light having the fourth polarization axis separated by the second polarization axis control means. According to this structure, the image display, capable of easily blocking either the light having the third polarization axis or the light having the fourth polarization axis, can easily advance only either the light having the third polarization axis or the light having the fourth polarization axis toward the eyes of the observer.

The image display according to the aforementioned aspect preferably further comprises a third polarizing plate arranged between the light source and the second polarization axis control means for transmitting only light, having a prescribed polarization axis, included in the light irradiated from the light source. According to this structure, the image display can easily separate the light irradiated from the light source into the light having the first polarization axis and the light having the second polarization axis through the first polarization axis control means while easily separating the light into the light having the third polarization axis and the light having the fourth polarization axis through the second polarization axis control means.

The image display according to the aforementioned aspect preferably further comprises third polarization axis control means controlling the light having the first polarization axis to light having a fifth polarization axis while controlling the light having the second polarization axis to another light having a sixth polarization axis, the second polarization axis control means is preferably switchable between a case of advancing either the light having the third polarization axis or the light having the fourth polarization axis toward the eyes of the observer and another case of advancing both of the light having the third polarization axis and the light having the fourth polarization axis toward the eyes of the observers, the third polarization axis control means is preferably switchable between a case of advancing either the light having the fifth polarization axis or the light having the sixth polarization axis toward the eyes of the observer and another case of advancing both of the light having the fifth polarization axis and the light having the sixth polarization axis toward the eyes of the observer, and the second polarization axis control means preferably advances both of the light having the third polarization axis and the light having the fourth polarization axis toward the eyes of the observer and the third polarization axis control means preferably advances both of the light having the fifth polarization axis and the light having the sixth polarization axis toward the eyes of the observer, thereby providing a planar image to the observer. According to this structure, the single image display can provide both stereoscopic and planar images to the observer by switching the second polarization axis control means between the case of advancing either the light having the third polarization axis or the light having the fourth polarization axis toward the eyes of the observer and the case of advancing both of the light having the third polarization axis and the light having the fourth polarization axis toward the eyes of the observer and switching the third polarization axis control means between the case of advancing either the light having the fifth polarization axis or the light having the sixth polarization axis toward the eyes of the observer and the case of advancing both of the light having the fifth polarization axis and the light having the sixth polarization axis toward the eyes of the observer.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

First, the structure of an image display 1 according to the embodiment of the present invention is described with reference to FIGS. 1 to 7.

Figure 1:
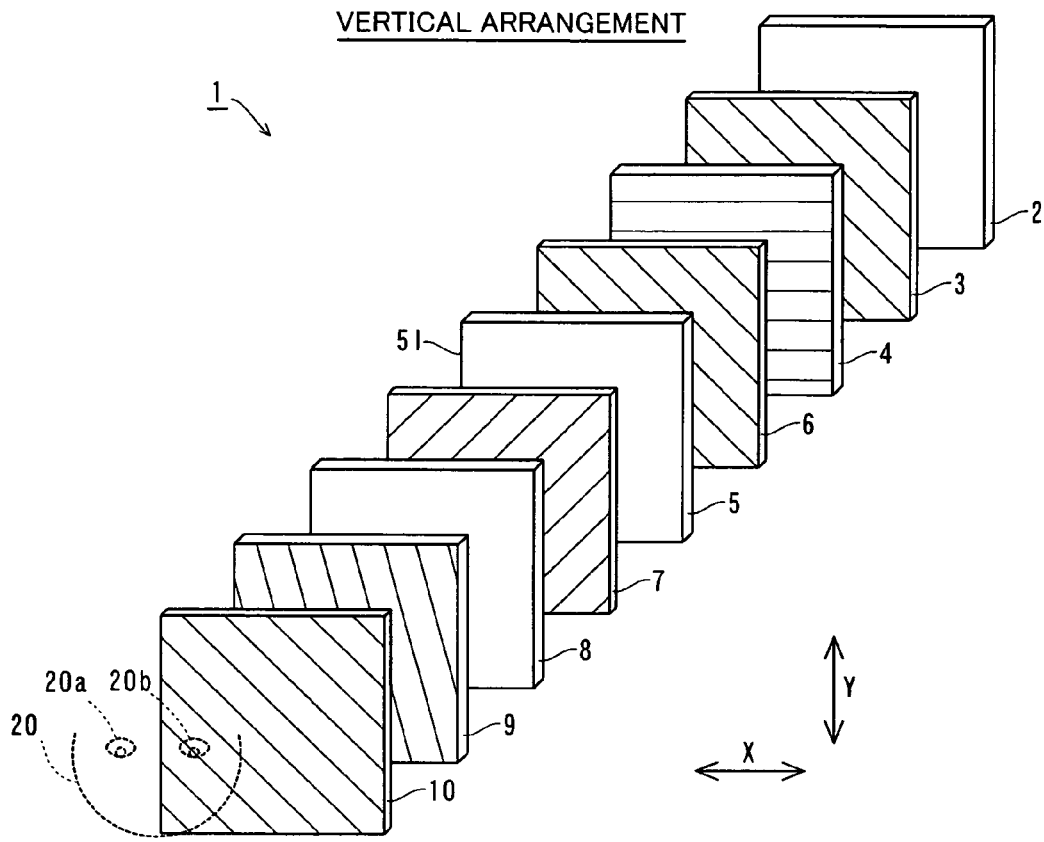
FIG. 1 is an exploded perspective view showing an image display according to an embodiment of the present invention.

As shown in FIG. 1, the image display 1 according to the embodiment of the present invention comprises a backlight 2, a polarizing plate 3 arranged on a light emission side of the backlight 2, a lateral polarization control liquid crystal panel 4 (hereinafter referred to as "lateral liquid crystal panel 4") arranged on a light emission side of the polarizing plate 3, a display panel 5 formed by a liquid crystal display panel displaying images arranged on a light emission side of the lateral liquid crystal panel 4, polarizing plates 6 and 7 arranged to hold the display panel 5 therebetween, a retardation plate 8 arranged on a light emission side of the polarizing plate 7, a vertical polarization control liquid crystal panel 9 (hereinafter referred to as "vertical liquid crystal panel 9") arranged on a light emission side of the retardation plate 8 and a polarizing plate 10 arranged on a light emission side of the vertical liquid crystal panel 9. The backlight 2 is an example of the "light source" in the present invention, and the polarizing plate 3 is an example of the "third polarizing plate" in the present invention. The lateral liquid crystal panel 4 is an example of the "second polarization axis control means" or the "first polarization control liquid crystal panel" in the present invention, and the polarizing plate 6 is an example of the "second polarizing plate" in the present invention. The retardation plate 8 is an example of the "first polarization axis control means" in the present invention, and the vertical liquid crystal panel 9 is an example of the "third polarization axis control means" or the "second polarization control liquid crystal panel" in the present invention. The polarizing plate 10 is an example of the "first polarizing plate" in the present invention. In relation to this embodiment, the wording "the display panel 5 is vertically arranged" denotes a state where a reference side 51 (see FIG. 1) of the display panel 5 is vertically arranged (in a direction Y in FIG. 1) as viewed from an observer 20, and the wording "the display panel 5 is laterally arranged" denotes a state where the reference side 51 of the display panel 5 is horizontally arranged (in a direction X in FIG. 1) as viewed from the observer 20. The direction Y (vertical direction) is an example of the "first direction" in the present invention, and the direction X (horizontal direction) is an example of the "second direction" in the present invention.

The backlight 2 has a function of irradiating light toward the polarizing plate 3. The polarizing plate 3, having a polarization axis of about 135° as viewed from the observer 20, has a function of transmitting only light having a polarization axis of about 135° as viewed from the observer 20. According to the embodiment, the angle of the polarization axis denotes that in the vertically arranged state of the display panel 5.

Figure 3:
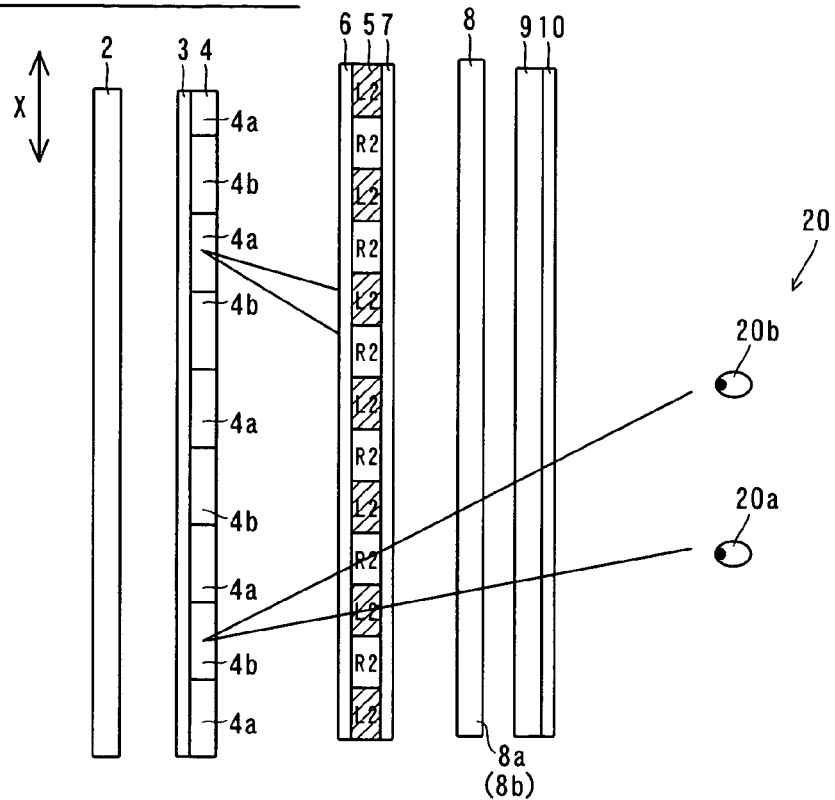
FIG. 3 is a diagram showing the display panel 5 of the image display according to the embodiment of the present invention shown in FIG. 1 in a state laterally arranged for displaying stereoscopic images and observed by the observer from above.
Figure 4:
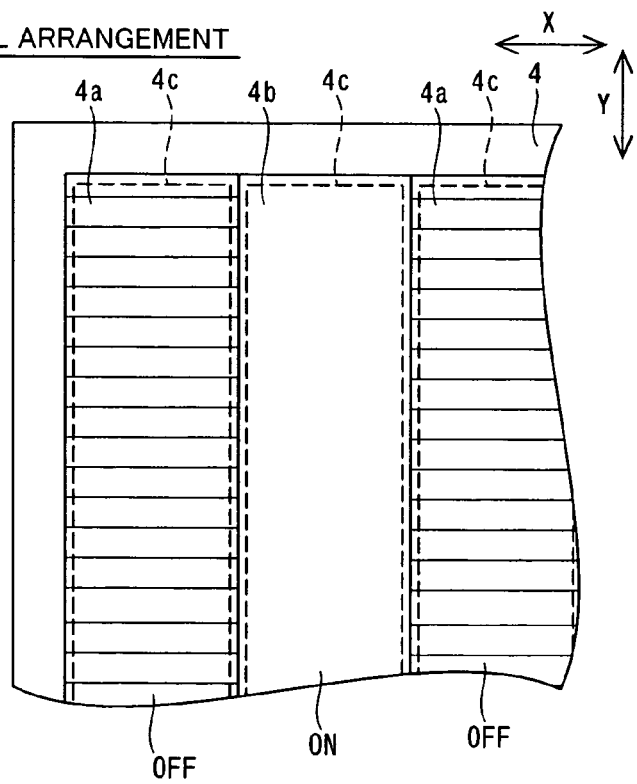
FIG. 4 is a partially enlarged view of a lateral liquid crystal panel of the image display according to the embodiment of the present invention shown in FIG. 1.

As shown in FIG. 4, the lateral liquid crystal panel 4 has polarization control areas 4a and 4b. The polarization control areas 4a are examples of the "third polarization control areas" in the present invention, and the polarization control areas 4b are examples of the "fourth polarization control areas" in the present invention. The polarization control areas 4a and 4b are so arranged as to substantially perpendicularly extend (in the direction Y) with respect to a line segment connecting the left and right eyes 20a and 20b of the observer 20 (see FIG. 3) with each other when the display panel 5 (see FIG. 1) is laterally arranged as shown in FIGS. 3 and 4. The polarization control areas 4a and 4b are provided with electrodes 4c extending in the direction Y respectively. Thus, the image display 1 can apply voltage to liquid crystals located on the polarization control areas 4a and 4b of the lateral liquid crystal panel 4 through the electrodes 4c, so that the same can easily change polarization control states of the polarization control areas 4a and 4b by controlling a state of applying voltage to the liquid crystals. Thus, the image display 1 can perform polarization control with the lateral liquid crystal panel 4 only when the display panel 5 is laterally arranged. The polarization control areas 4a and 4b have horizontal polarization axes (about 0°) as viewed from the observer 20. The polarization control areas 4a of the lateral liquid crystal panel 4 have a function of changing the polarization axis of light transmitted therethrough to that line-symmetrical with respect to the horizontal polarization axis (about 0°) of the polarization control areas 4a of the lateral liquid crystal panel 4. More specifically, the lateral liquid crystal panel 4 has a function of providing phase difference of $\lambda/2$ to incident light, so that light having a polarization axis of an angle $\alpha$, for example, with respect to the horizontal polarization axis (about 0°) of the lateral liquid crystal panel 4 is emitted with a polarization axis of an angle $-\alpha$ through the horizontal polarization axis (about 0°) of the lateral liquid crystal panel 4. According to this embodiment, the retardation plate 8 and the vertical liquid crystal panel 9 also have similar functions, as described later. The polarization control areas 4a and 4b of the lateral liquid crystal panel 4 have functions of invalidating the horizontal polarization axis (about 0°) and transmitting light having a prescribed polarization axis without changing the polarization axis through a voltage application state (ON-state) and validating the horizontal polarization axis (about 0°) and changing the polarization axis of light line-symmetrically with respect to the polarization axis through a voltage nonapplication state (OFF-state). When the display panel 5 is laterally arranged as shown in FIGS. 3 and 4, the polarization control areas 4a enter a voltage application state (ON-state), and the polarization control areas 4b enter a voltage nonapplication state (OFF-state). The polarizing plate 6, having a polarization axis of about 135° as viewed from the observer 20 as shown in FIG. 1, has a function of transmitting only light having a polarization axis of about 135° as viewed from the observer 20.

Figure 5:
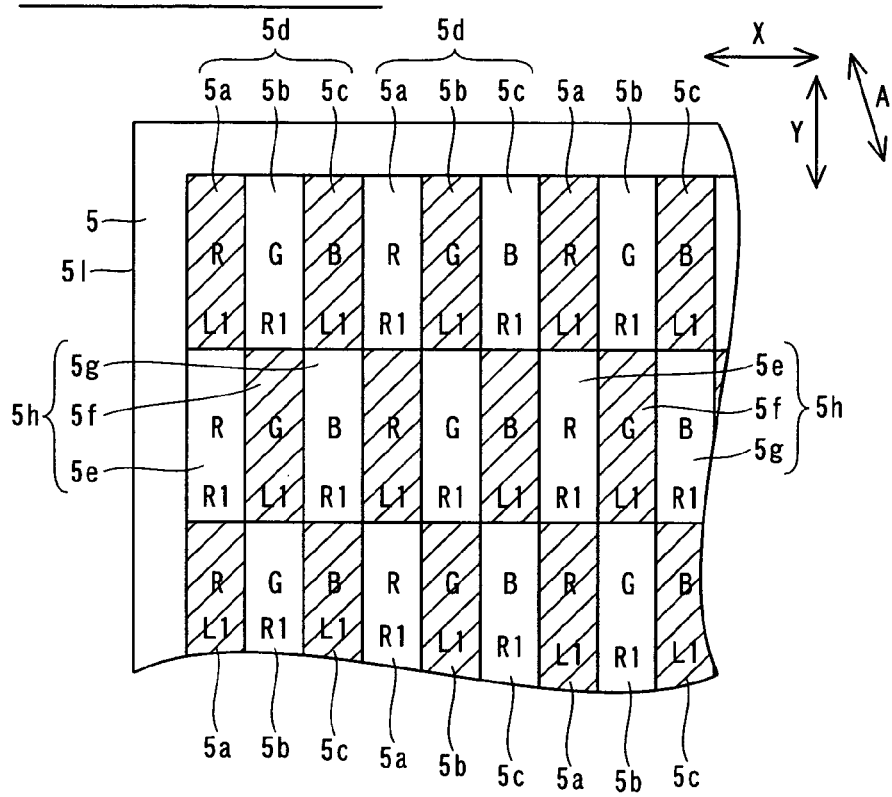
FIG. 5 is a partially enlarged view showing the vertically arranged state of the display panel 5 of the image display according to the embodiment of the present invention shown in FIG. 1.
Figure 6:
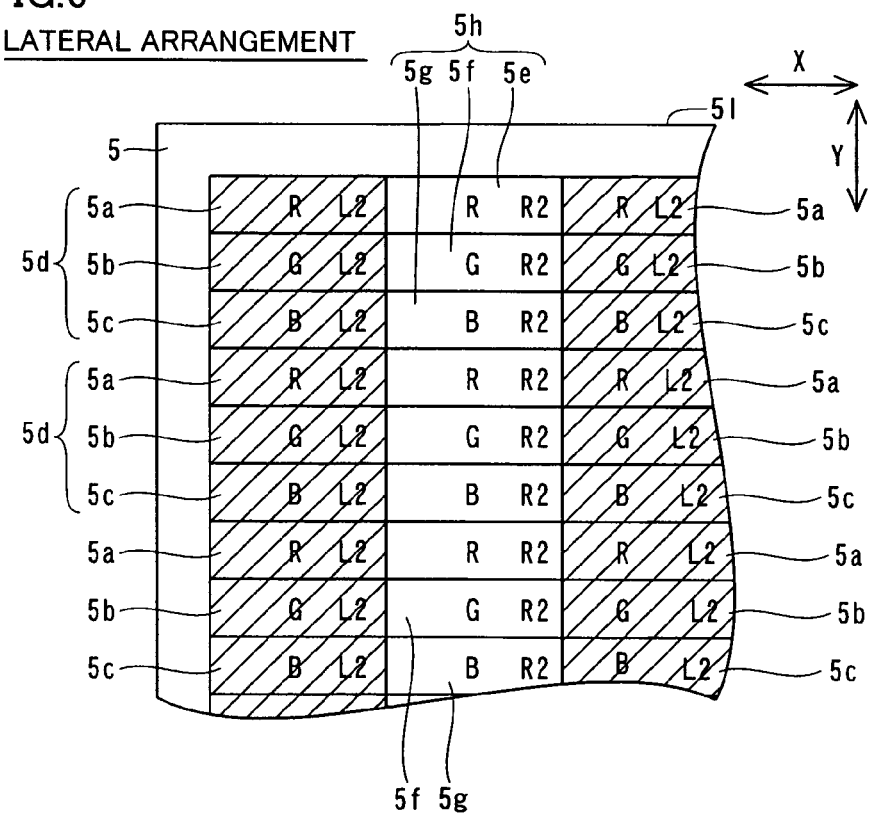
FIG. 6 is a partially enlarged view showing the laterally arranged state of the display panel 5 of the image display according to the embodiment of the present invention shown in FIG. 1.

The display panel 5 has a function of emitting light incident upon the same while changing the polarization axis thereof by about 90°. As shown in FIG. 5, the display panel 5 has a plurality of pixel areas 5d each formed by three of dot areas 5a to 5c for displaying the three primary colors or light, i.e., red (R), green (G) and blue (B), respectively and a plurality of pixel areas 5h each formed by three dot areas 5e to 5g for displaying the three primary colors of light respectively.

According to this embodiment, left- and right-eye images L1 and R1 displayed on the dot areas 5a to 5c and 5e to 5g respectively are arranged in the form of a hound's tooth check as exemplary stepwise arrangement when the display panel 5 is vertically arranged. More specifically, FIG. 5 shows the left- and right-eye images L1 and R1 in hatched (slanted) and unhatched (unslanted) manners respectively in the dot areas 5a to 5c and 5e to 5g. As shown in FIG. 5, the red, green and blue dot areas 5a to 5c and 5e to 5g are continuous in an oblique direction (direction A in FIG. 5) intersecting with both directions X and Y in the left-eye images L1 located on the hatched areas. Also in the right-eye images R1 located on the unhatched areas, the red, green and blue dot areas 5a to 5c and 5e to 5g are continuous in the oblique direction (direction A in FIG. 5). The display panel 5 alternately displays the left- and right-eye images L1 and R1 in the directions X and Y intersecting with the oblique direction (direction A in FIG. 5) in which the red, green and blue dot areas 5a to 5c and 5e to 5g continuously extend.

When the display panel 5 is laterally arranged, on the other hand, the dot areas 5a to 5c and 5e to 5f corresponding to the three primary colors (red, green and blue) of light are arranged to extend in the direction Y substantially perpendicular (vertical) to the line segment connecting the left and right eyes 20a and 20b of the observer 20 (see FIG. 3) with each other respectively. The lengths of the dot areas 5a to 5c and 5e to 5f in the direction (lateral direction) (direction X) along the line segment connecting the left and right eyes 20a and 20b of the observer 20 (see FIG. 3) with each other correspond to the lengths of the polarization control areas 4a and 4b (see FIG. 4) of the lateral liquid crystal panel 4 (see FIG. 4) in the direction (lateral direction) (direction X) along the line segment connecting the left and right eyes 20a and 20b of the observer 20 (see FIG. 3) with each other respectively. In the lateral arrangement shown in FIG. 6, the display panel 5 displays the red, green and blue dot areas 5a to 5c and 5e to 5g as continuously extending in the vertical direction (direction Y) in left- and right-eye images L2 and R2 shown in hatched (slanted) and unhatched manners respectively. In the lateral arrangement shown in FIG. 6, further, the display panel 5 alternately displays the left- and right-eye images L2 and R2, extending in the vertical direction (direction Y), in the lateral direction (direction X). As shown in FIG. 3, the areas (hatched areas) displaying the left-eye images L2 are arranged on lines connecting the polarization control areas 4b and 4b of the lateral liquid crystal panel 4 and the left and right eyes 20a and 20b of the observer 20 with each other respectively. Further, the areas (unhatched areas) displaying the right-eye images R2 are arranged on lines connecting the polarization control areas 4a and 4b of the lateral liquid crystal panel 4 and the left and right eyes 20a and 20b of the observer 20 with each other respectively.

Figure 2:
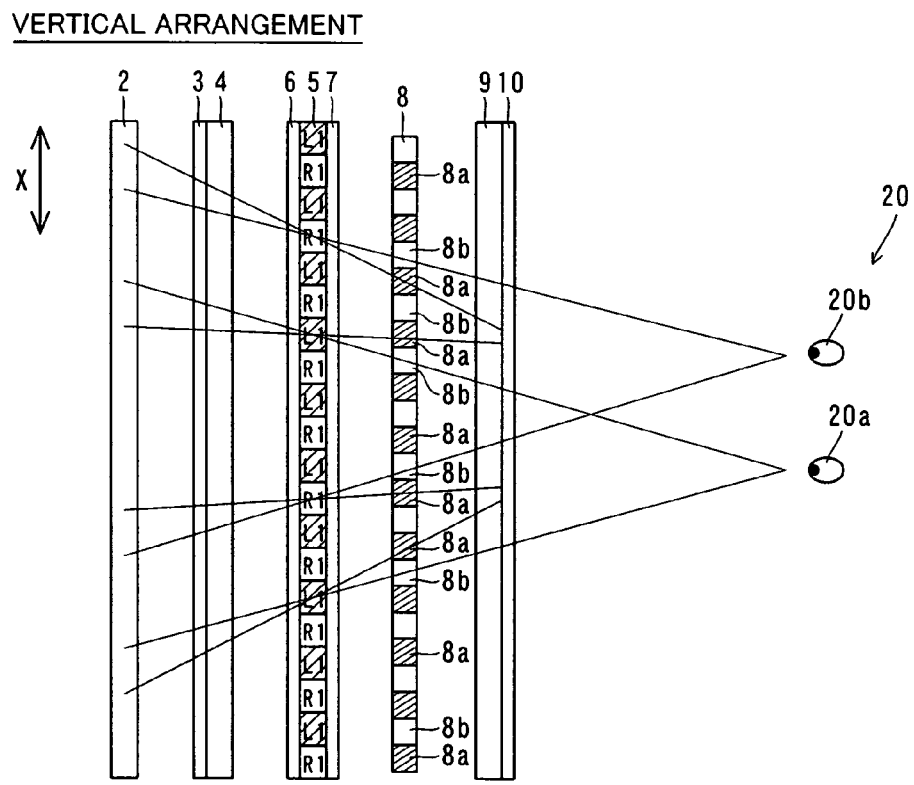
FIG. 2 is a diagram showing a display panel 5 of the image display according to the embodiment of the present invention shown in FIG. 1 in a state vertically arranged for displaying stereoscopic images and observed by an observer from above.
Figure 7:
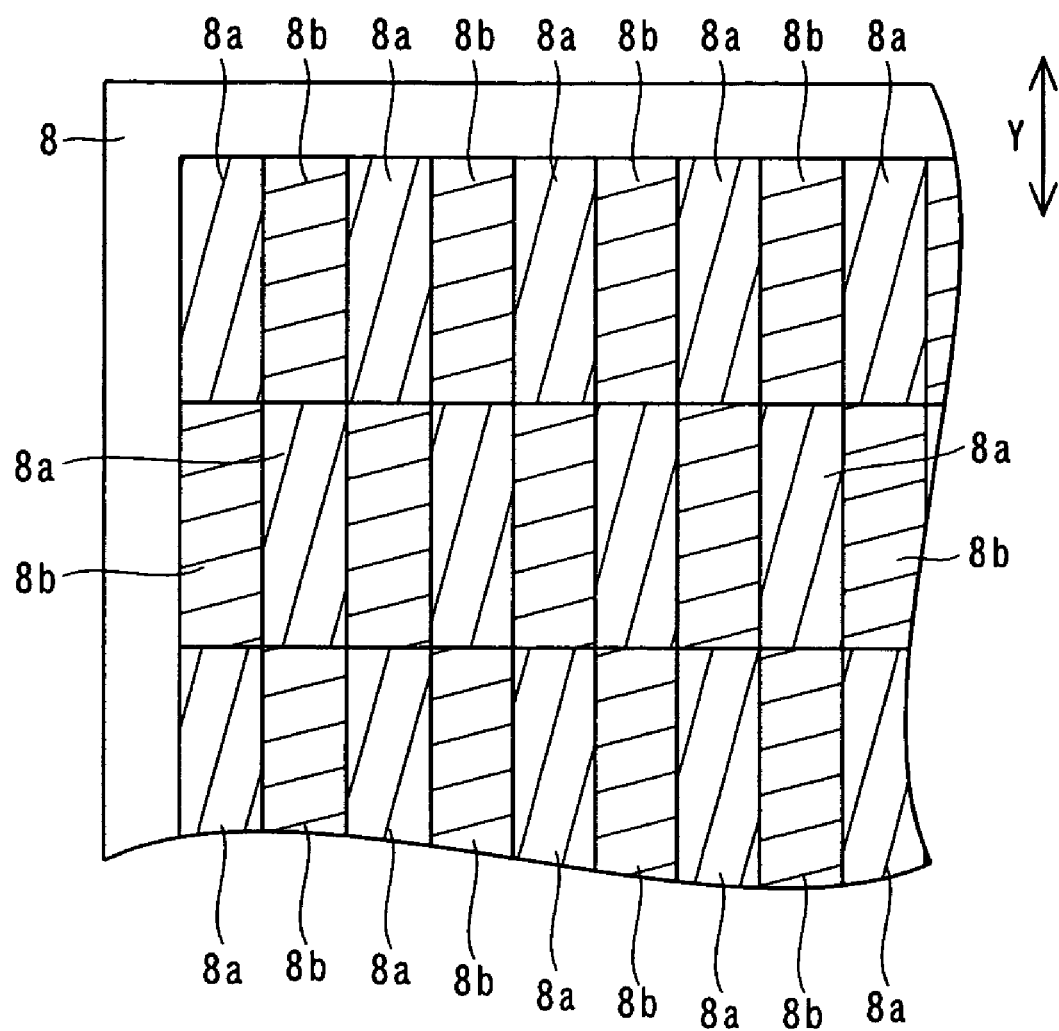
FIG. 7 is a partially enlarged view of a retardation plate of the image display according to the embodiment of the present invention shown in FIG. 1.

The polarizing plate 7, having a polarization axis of about 135° as viewed from the observer 20 as shown in FIG. 1, has a function of transmitting only light having a polarization axis of about 135° as viewed from the observer 20. The retardation plate 8 includes a plurality of polarization control areas 8a and a plurality of polarization control areas 8b, as shown in FIG. 7. The polarization control areas 8a are examples of the "first polarization control areas" in the present invention, and the polarization control areas 8b are examples of the "second polarization control areas" in the present invention. As shown in FIG. 2, the polarization control areas 8a are arranged on lines connecting the areas of the display panel 5 displaying the left- and right-eye images L1 and R1 and the right and left eyes 20b and 20a of the observer 20 with each other respectively. The polarization control areas 8b are arranged on lines connecting the areas of the display panel 5 displaying the left- and right-eye images L1 and R1 and the left and right eyes 20a and 20b of the observer 20 with each other respectively. As shown in FIG. 7, the polarization areas 8a and 8b have substantially rectangular shapes corresponding to the dot areas 5a to 5c and 5e to 5g of the vertically arranged display panel 5 shown in FIG. 5. When the display panel 5 (see FIG. 5) is vertically arranged, the longitudinal direction of the polarization control areas 8a and 8b is arranged substantially perpendicularly to the line segment connecting the left and right eyes 20a and 20b (see FIG. 2) of the observer 20 (see FIG. 2) with each other, similarly to the dot areas 5a to 5c and 5e to 5g of the display panel 5. The polarization control areas 8a and 8b of the retardation plate 8 have a function of changing the polarization axis of light transmitted therethrough to that line-symmetrical with respect to the polarization axis of the retardation plate 8.

According to this embodiment, the polarization control areas 8a and 8b of the retardation plate 8 are arranged in the form of a hound's tooth check in correspondence to the areas of the display panel 5 displaying the left- and right-eye images L1 and R1 respectively, as shown in FIGS. 5 and 7. According to this embodiment, the polarization control areas 8a and 8b of the retardation plate 8 are arranged in the form of a hound's tooth check as exemplary stepwise arrangement. As shown in FIG. 7, the polarization control areas 8a and 8b have polarization axes of about 75° and about 15° as viewed from the observer 20 (see FIG. 2) respectively.

The vertical liquid crystal panel 9 has a polarization axis of about 165° as viewed from the observer 20, as shown in FIG. 1. The vertical liquid crystal panel 9 has a function of changing the polarization axis of light transmitted therethrough to that line-symmetrical with respect to the polarization axis of about 165° of the vertical liquid crystal panel 9. The vertical liquid crystal panel 9 also has functions of validating and invalidating the polarization axis of about 165° through ON- and OFF-states respectively. The polarizing plate 10 has a polarization axis of about 135° as viewed from the observer 20. Assuming that θ represents the crossing angle between the polarization axis of incident light and that of the polarizing plate 10 and C represents the intensity (amplitude) of the incident light, the polarizing plate 10 has a function of changing the incident light to that having a polarization axis of about 135° as viewed from the observer 20 and an intensity (amplitude) of C×(cos θ)² and transmitting the same.

(Stereoscopic Image Display Mode in Vertical Arrangement)

Figure 8:
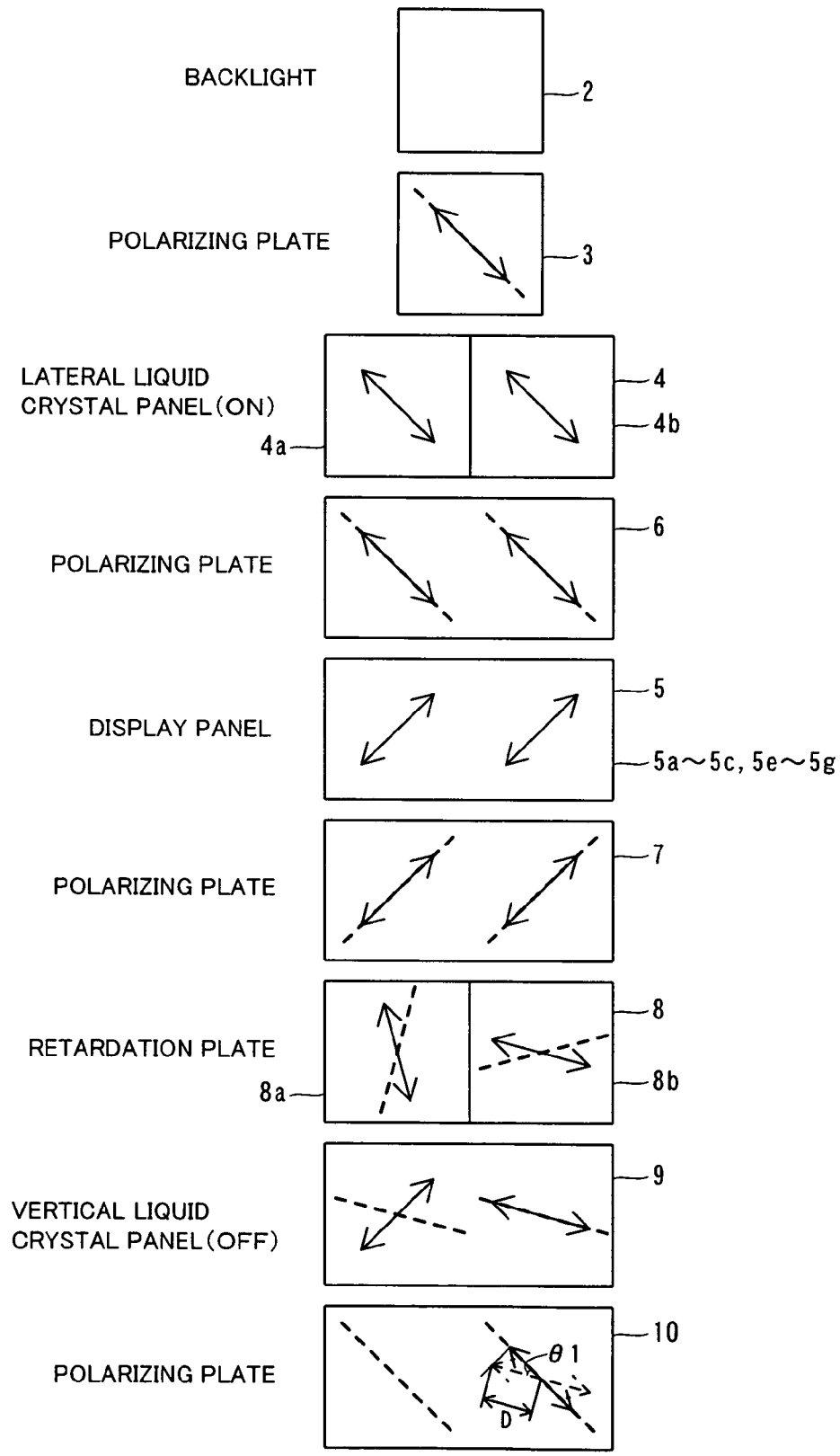
FIG. 8 is a diagram for illustrating a stereoscopic image display method in the vertically arranged state of the display panel 5 of the image display according to the embodiment of the present invention shown in FIG. 1.

Referring to FIG. 8, broken lines show the angles of the polarization axes of the polarizing plates 3, 6, 7 and 10, the lateral liquid crystal panel 4, the retardation plate 8 and the vertical liquid crystal panel 9, and arrows show the angles of the polarization axes of transmitted light respectively. A stereoscopic image display method in the vertical arrangement of the display panel 5 according to the embodiment of the present invention is now described with reference to FIGS. 2, 4 and 8.

When receiving light irradiated by the backlight 2 (see FIG. 2), the polarizing plate 3 transmits only light having a polarization axis of about 135° as viewed from the observer 20 (see FIG. 2), as shown in FIG. 8. The polarization control areas 4a and 4b of the lateral liquid crystal panel 4 transmit the light having the polarization axis of about 135° as viewed from the observer 20. At this time, the image display 1 applies voltage to the electrodes 4c (see FIG. 4) of the polarization control areas 4a and 4b of the lateral liquid crystal panel 4 in order to control the same to ON-states, thereby invalidating the polarization axes of the polarization control areas 4a and 4b of the lateral liquid crystal panel 4. Thus, the polarization control areas 4a and 4b of the lateral liquid crystal panel 4 transmit the light incident upon the same without changing the polarization axis thereof. Thereafter the polarizing plate 6 having the polarization axis of about 135° as viewed from the observer 20 transmits the light received from the lateral liquid crystal panel 4. The light emitted from the polarizing plate 6 enters the dot areas 5a to 5c and 5e to 5g of the display panel 5. In this case, the display panel 5 displays the left- and right-eye images L1 and R1 (see FIG. 2) on the hatched (slanted) and unhatched areas of the dot areas 5a to 5c and 5e to 5g respectively, as shown in FIG. 5. The display panel 5 emits the light incident upon the same while changing the polarization axis thereof by 90°, as shown in FIG. 8. In other words, the display panel 5 emits the light transmitted therethrough while changing the polarization axis thereof to about 45° as viewed from the observer 20 (see FIG. 2). The polarizing plate 7 having the polarization axis of about 45° as viewed from the observer 20 transmits the light received from the display panel 5. The light transmitted through the polarizing plate 7 enters the polarization control areas 8a or 8b of the retardation plate 8.

The polarization control areas 8a of the retardation plate 8 transmit the light, having the polarization axis of about 45° as viewed from the observer 20 (see FIG. 2) according to this embodiment, incident upon the same while changing the polarization axis thereof to that line-symmetrical with respect to the polarization axis of about 75° of the polarization control areas 8a of the retardation plate 8, as shown in FIG. 8. In other words, the light emitted from the polarization control areas 8a has a polarization axis of about 105° as viewed from the observer 20. The vertical liquid crystal panel 9 transmits the light received from the polarization control areas 8a of the retardation plate 8 while changing the polarization axis thereof to that line-symmetrical with respect to the polarization axis of about 165° of the vertical liquid crystal panel 9. In other words, the light emitted from the vertical liquid crystal panel 9 has a polarization axis of about 45° as viewed from the observer 20. Thereafter the polarizing plate 10 having the polarization axis of about 135° as viewed from the observer 20 blocks the light emitted from the vertical liquid crystal panel 9. In this case, the polarization control areas 8a of the retardation plate 8, arranged on the lines connecting the areas of the display panel 5 displaying the left-eye images L1 and the right eye 20b of the observer 20 with each other as shown in FIG. 2, can inhibit the left-eye images L1 from entering the right eye 20b of the observer 20. Further, the polarization control areas 8a of the retardation plate 8, arranged on the lines connecting the areas of the display panel 5 displaying the right-eye images R1 and the left eye 20a of the observer 20 with each other, can inhibit the right-eye images R1 from entering the left eye 20a of the observer 20.

On the other hand, the polarization control areas 8b of the retardation plate 8 transmit the light incident upon the same while changing the polarization axis thereof to that line-symmetrical with respect to the polarization axis of about 15° of the polarization control areas 8b of the retardation plate 8, as shown in FIG. 8. In other words, the light emitted from the polarization control areas 8b of the retardation plate 8 has a polarization axis of about 165° as viewed from the observer 20. The vertical liquid crystal panel 9 transmits the light received from the polarization control areas 8b of the retardation plate 8 while changing the polarization axis thereof to that line-symmetrical with respect to the polarization axis of about 165° of the vertical liquid crystal panel 9. In this case, the vertical liquid crystal panel 9, having the same angle of the polarization axis as that of the polarization axis of the light emitted from the polarization control areas 8b of the retardation plate 8, emits the light incident upon the same without changing the polarization axis of 165°. Thereafter the polarizing plate 10 emits the light received from the vertical liquid crystal panel 9 while changing the polarization axis thereof to that of about 135° as viewed from the observer 20 (see FIG. 2) with an intensity (amplitude) of D×(cos θ1)² (θ1=about 165°−about 135°=about 30°) assuming that D represents the intensity (amplitude) of the light, for example. In this case, the image display 1 can introduce the left-eye images L1 into the left eye 20a of the observer 20 through the polarization control areas 8b of the retardation plate 8 arranged on the lines connecting the areas of the display panel 5 displaying the left-eye images L1 and the left eye 20a of the observer 20 with each other, as shown in FIG. 20. Further, the image display 1 can introduce the right-eye images R1 into the right eye 20b of the observer 20 through the polarization control areas 8b of the retardation plate 8 arranged on the lines connecting the areas of the display panel 5 displaying the right-eye images R1 and the right eye 20b of the observer 20 with each other, as shown in FIG. 2.

As hereinabove described, the image display introduces the left- and right-eye images L1 and R1 into the left and right eyes 20a and 20b of the observer 20 respectively in the vertical arrangement, whereby the observer 20 can observe stereoscopic images.

(Stereoscopic Image Display Mode in Lateral Arrangement)

A stereoscopic image display method in lateral arrangement of the display panel 5 according to the embodiment of the present invention is now described with reference to FIGS. 3, 4 and 9.

Figure 9:
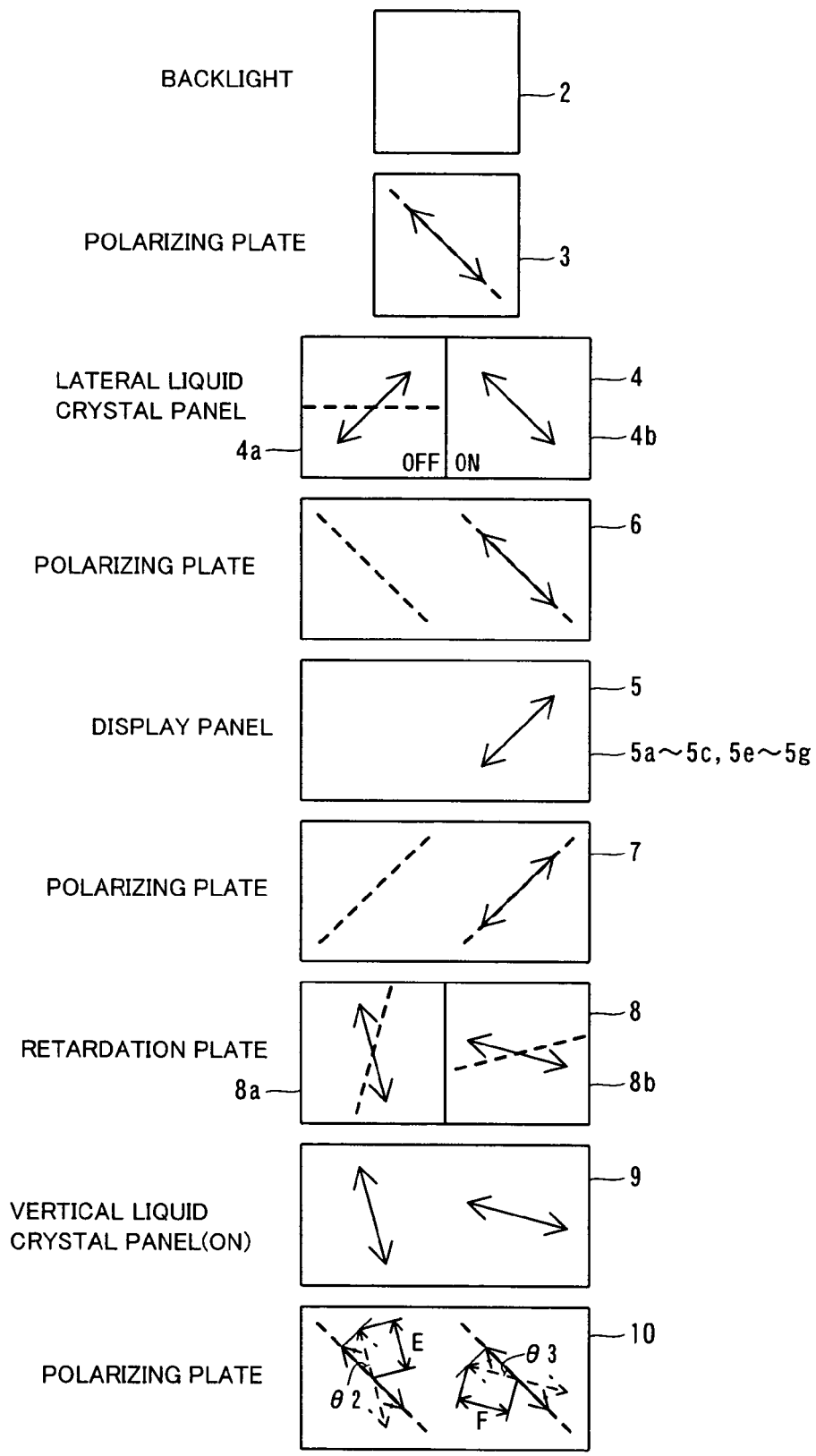
FIG. 9 is a diagram for illustrating a stereoscopic image display method in the laterally arranged state of the display panel 5 of the image display according to the embodiment of the present invention shown in FIG. 1.

When receiving light irradiated by the backlight 2 (see FIG. 3), the polarizing plate 3 transmits only light having a polarization axis of about 135° as viewed from the observer 20 (see FIG. 3), as shown in FIG. 9. While the polarization axes rotate by 90° respectively in lateral arrangement as compared with the vertical arrangement, the following description of the lateral arrangement is made with the same polarization axes as those in the vertical arrangement, in order to simplify the illustration. The polarization control areas 4a and 4b of the lateral liquid crystal panel 4 transmit the light having the polarization axis of about 135° as viewed from the observer 20.

In the lateral arrangement, the image display 1 applies no voltage to the electrodes 4c (see FIG. 4) of the polarization control areas 4a of the lateral liquid crystal panel 4 in order to control the same to OFF-states, thereby validating the horizontal polarization axis (about 0°) of the polarization control areas 4a of the lateral liquid crystal panel 4. Thus, the polarization control areas 4a of the lateral liquid crystal panel 4 transmit the light incident upon the same while changing the polarization axis thereof to that line-symmetrical with respect to the horizontal polarization axis (about 0°) of the polarization control areas 4a of the lateral liquid crystal panel 4. In other words, the light emitted from the polarization control areas 4a has a polarization axis of about 45° as viewed from the observer 20. Then, the polarizing plate 6 having the polarization axis of about 135° as viewed from the observer 20 blocks the light emitted from the polarization control areas 4a of the lateral liquid crystal panel 4. In this case, the image display 1 can inhibit the right-eye images R2 from entering the left eye 20a of the observer 20 due to the areas of the display panel 5 displaying the right-eye images R2 arranged on the lines connecting the polarization control areas 4a of the lateral liquid crystal panel 4 and the left eye 20a of the observer 20 with each other. Further, the image display 1 can inhibit the left-eye images L2 from entering the right eye 20b of the observer 20 due to the areas of the display panel 5 displaying the left-eye images L2 arranged on the lines connecting the polarization control areas 4b of the lateral liquid crystal panel 4 and the right eye 20b of the observer 20 with each other.

On the other hand, the image display 1 applies voltage to the electrodes 4c (see FIG. 4) of the polarization control areas 4b of the lateral liquid crystal panel 4 in the lateral arrangement in order to control the same to ON-states, thereby invalidating the polarization axes of the polarization control areas 4b of the lateral liquid crystal panel 4. Thus, the polarization control areas 4b of the lateral liquid crystal panel 4 emit the light incident upon the same without changing the polarization axis thereof, as shown in FIG. 9. In other words, the light emitted from the polarization control areas 4b of the lateral liquid crystal panel 4 has a polarization axis of about 135° as viewed from the observer 20 (FIG. 3).

The polarizing plate 6 having the polarization axis of about 135° as viewed from the observer 20 (see FIG. 3) transmits the light received from the polarization control areas 4b of the lateral liquid crystal panel 4. The light emitted from the polarizing plate 6 enters the dot areas 5a to 5c and 5e to 5f of the display panel 5. The display panel 5 emits the light incident upon the same while changing the polarization axis thereof by 90°. In other words, the display panel 5 transmits the light while changing the polarization axis thereof to about 45° as viewed from the observer 20. The polarizing plate 7 having the polarization axis of about 45° as viewed from the observer 20 transmits the light received from the display panel 5. The light transmitted through the polarizing plate 7 enters the polarization control areas 8a or 8b of the retardation plate 8.

According to this embodiment, the polarization control areas 8a of the retardation plate 8 transmit the light, having the polarization axis of about 45° as viewed from the observer 20, incident upon the same while changing the polarization axis thereof to that line-symmetrical with respect to the polarization axis of about 75° of the polarization control areas 8a of the retardation plate 8. In other words, the light emitted from the polarization control areas 8a has a polarization axis of about 105° as viewed from the observer 20. The image display 1 controls the vertical liquid crystal panel 9 to an ON-state, thereby invalidating the polarization axis of the vertical liquid crystal panel 9. Thus, the vertical liquid crystal panel 9 emits the light incident upon the same without changing the polarization axis thereof. In other words, the light emitted from the vertical liquid crystal panel 9 has a polarization axis of about 105° as viewed from the observer 20. Thereafter the polarizing plate 10 emits the light received from the vertical liquid crystal panel 9 while changing the polarization axis thereof to that of about 135° as viewed from the observer 20 with an intensity (amplitude) of E×(cos θ2)² (θ2=about 135°−about 105°=about 30°) assuming that E represents the intensity (amplitude) of the light, for example. At this time, the image display 1 can introduce the left-eye images L2 into the left eye 20a of the observer 20 through the areas of the display panel 5 displaying the left-eye images L2 arranged on the lines connecting the polarization control areas 4b of the lateral liquid crystal panel 4 and the left eye 20a of the observer 20 with each other, as shown in FIG. 3. Further, the image display 1 can introduce the right-eye images R2 into the right eye 20b of the observer 20 through the areas of the display panel 5 displaying the left-eye images L2 arranged on the lines connecting the polarization control areas 4b of the lateral liquid crystal panel 4 and the right eye 20b of the observer 20 with each other.

On the other hand, the polarization control areas 8b of the retardation plate 8 transmit the light incident upon the same while changing the polarization axis thereof to that line-symmetrical with respect to the polarization axis of about 15° of the polarization control areas 8b of the retardation plate 8, as shown in FIG. 9. In other words, the light emitted from the polarization control areas 8b has a polarization axis of about 165° as viewed from the observer 20 (see FIG. 3). The image display 1 controls the vertical liquid crystal panel 9 to an ON-state, thereby invalidating the polarization axis of the vertical liquid crystal panel 9. Thus, the vertical liquid crystal panel 9 emits the light received from the polarization control areas 8b without changing the polarization axis thereof. In other words, the light emitted from the vertical liquid crystal panel 9 has a polarization axis of about 165° as viewed from the observer 20. Thereafter the polarizing plate 10 emits the light received from the vertical liquid crystal panel 9 while changing the polarization axis thereof to that of about 135° as viewed from the observer 20 with an intensity (amplitude) of F×(cosθ3)² (θ3=about 165°−about 135°=about 30°) assuming that F represents the intensity (amplitude) of the light, for example. At this time, the image display 1 can introduce the left-eye images L2 into the left eye 20a of the observer 20 through the areas of the display panel 5 displaying the left-eye images L2 arranged on the lines connecting the polarization control areas 4b of the lateral liquid crystal panel 4 and the left eye 20a of the observer 20 with each other, as shown in FIG. 3. Further, the image display 1 can introduce the right-eye images R2 into the right eye 20b of the observer 20 through the areas of the display panel 5 displaying the right-eye images R2 arranged on the lines connecting the polarization control areas 4b of the lateral liquid crystal panel 4 and the right eye 20b of the observer 20 with each other.

As hereinabove described, the image display introduces the left- and right-eye images L2 and R2 into the left and right eyes 20a and 20b of the observer 20 respectively in the lateral arrangement, whereby the observer 20 can observe stereoscopic images.

(Planar Image Display Mode in Vertical Arrangement)

Figure 10:
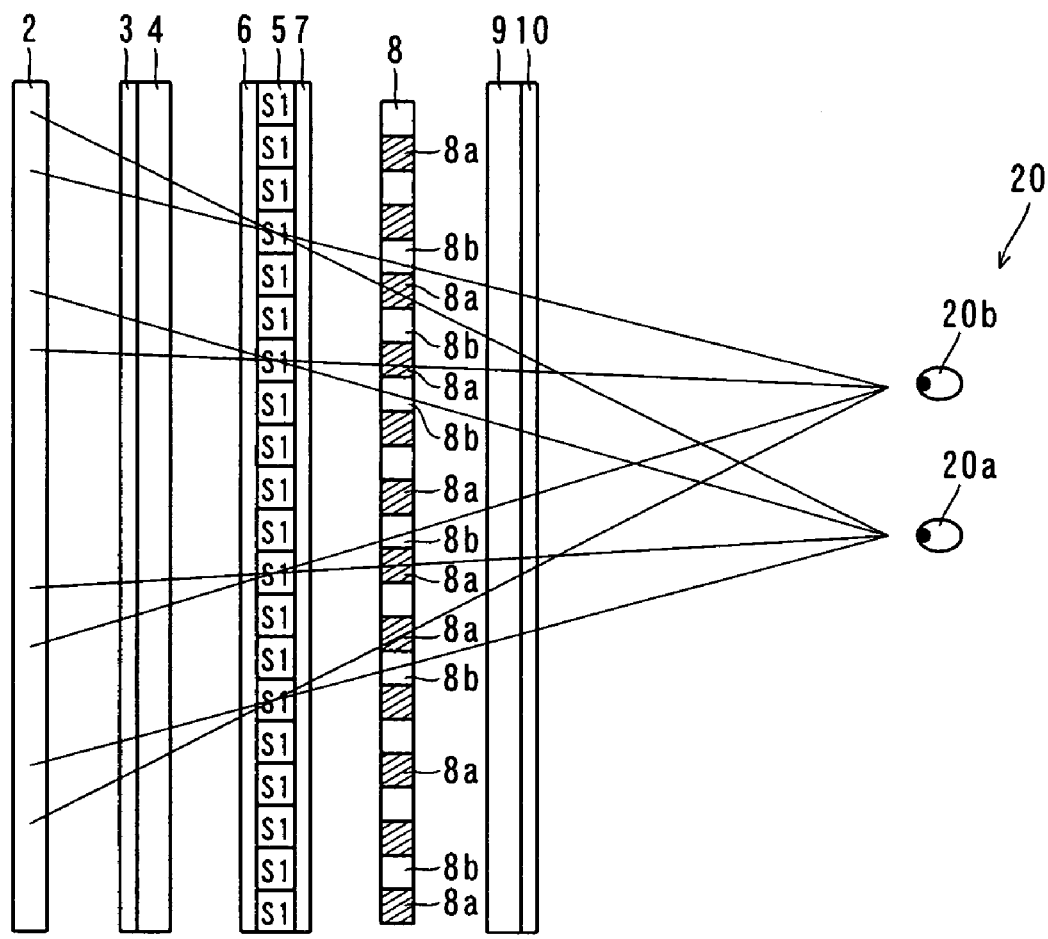
FIG. 10 illustrates the display panel 5 of the image display according to the embodiment of the present invention shown in FIG. 1 in a state vertically arranged for displaying planar images and observed by the observer from above.

A planar image display method in the vertical arrangement of the display panel 5 according to the embodiment of the present invention is now described with reference to FIGS. 4, 10 and 11.

Figure 11:
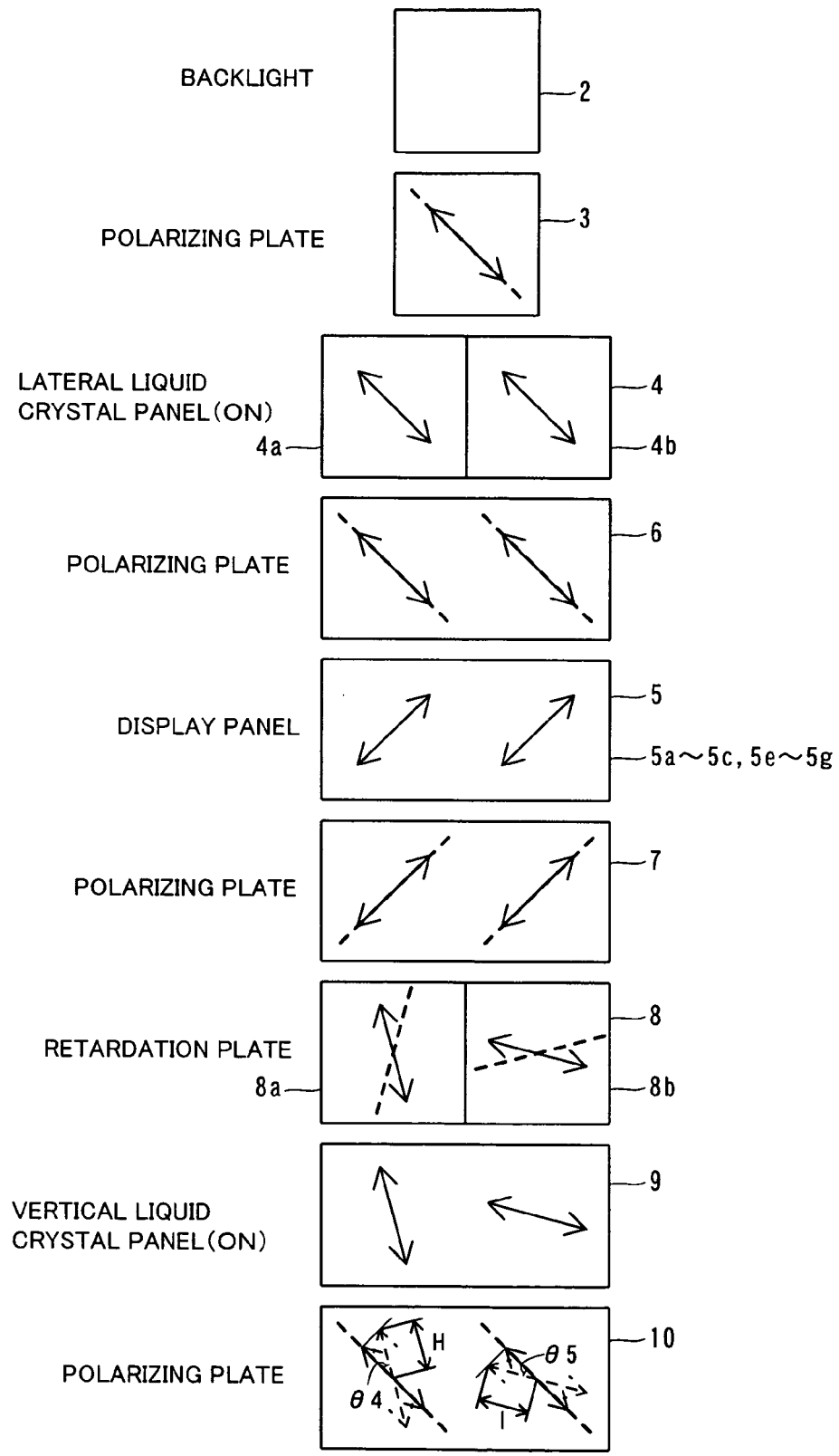
FIG. 11 is a diagram for illustrating planar image display methods in the vertically and laterally arranged states of the display panel 5 of the image display according to the embodiment of the present invention shown in FIG. 1.

When receiving light irradiated by the backlight 2 (see FIG. 10), the polarizing plate 3 transmits only light having a polarization axis of about 135° as viewed from the observer 20 (see FIG. 10), as shown in FIG. 11. The polarization control areas 4a and 4b of the lateral liquid crystal panel 4 transmit the light having the polarization axis of about 135° as viewed from the observer 20. At this time, the image display 1 applies voltage to the electrodes 4c (see FIG. 4) of the polarization control areas 4a and 4b of the lateral liquid crystal panel 4 in order to control the same to ON-states, thereby invalidating the polarization axes of the polarization control areas 4a and 4b of the lateral liquid crystal panel 4. Thus, the polarization control areas 4a and 4b of the lateral liquid crystal panel 4 transmit the light incident upon the same without changing the polarization axis thereof, as shown in FIG. 11. Thereafter the polarizing plate 6 having the polarization axis of about 135° as viewed from the observer 20 transmits the light received from the lateral liquid crystal panel 4. The light emitted from the polarizing plate 6 enters the dot areas 5a to 5c and 5e to 5g of the display panel 5. In this case, the display panel 5 displays planar images S1 (see FIG. 10) on all dot areas 5a to 5c and 5e to 5g (see FIG. 10). The display panel 5 emits the light incident upon the same while changing the polarization axis thereof by 90°. In other words, the display panel 5 emits the light transmitted therethrough while changing the polarization axis thereof to about 45° as viewed from the observer 20. The polarizing plate 7 having the polarization axis of about 45° as viewed from the observer 20 transmits the light received from the display panel 5. The light transmitted through the polarizing plate 7 enters the polarization control areas 8a or 8b of the retardation plate 8.

The polarization control areas 8a of the retardation plate 8 transmit the light, having the polarization axis of about 45° as viewed from the observer 20 (see FIG. 10) according to this embodiment, incident upon the same while changing the polarization axis thereof to that line-symmetrical with respect to the polarization axis of about 75° of the polarization control areas 8a of the retardation plate 8. In other words, the light emitted from the polarization control areas 8a has a polarization axis of about 105° as viewed from the observer 20. The image display 1 controls the vertical liquid crystal panel 9 to an ON-state, thereby invalidating the polarization axis of the vertical liquid crystal panel 9. Thus, the vertical liquid crystal panel 9 emits the light incident upon the same without changing the polarization axis thereof. In other words, the light emitted from the vertical liquid crystal panel 9 has the polarization axis of about 105° as viewed from the observer 20. Thereafter the polarizing plate 10 emits the light received from the vertical liquid crystal panel 9 while changing the polarization axis thereof to that of about 135° as viewed from the observer 20 with an intensity (amplitude) of H×(cosθ4)² (θ4=about 135°−about 105°=about 30°) assuming that H represents the intensity (amplitude) of the light, for example. The image display 1 introduces the planar images S1 of the display panel 5 corresponding to the polarization control areas 8a into the left and right eyes 20a and 20b of the observer 20 due to the light emitted from the polarizing plate 10 through the polarization control areas 8a.

On the other hand, the polarization control areas 8b of the retardation plate 8 transmit the light incident upon the same while changing the polarization axis thereof to that line-symmetrical with respect to the polarization axis of about 15° of the polarization control areas 8b of the retardation plate 8, as shown in FIG. 11. In other words, the light emitted from the polarization control areas 8b has a polarization axis of about 165° as viewed from the observer 20 (see FIG. 10). The image display 1 controls the vertical liquid crystal panel 9 to an ON-state, thereby invalidating the polarization axis of the vertical liquid crystal panel 9. Thus, the vertical liquid crystal panel 9 emits the light received from the polarization control areas 8b without changing the polarization axis thereof. In other words, the light emitted from the vertical liquid crystal panel 9 has a polarization axis of about 165° as viewed from the observer 20. Thereafter the polarizing plate 10 emits the light received from the vertical liquid crystal panel 9 while changing the polarization axis thereof to that of about 135° as viewed from the observer 20 with an intensity (amplitude) of I×(cos θ5)² (θ5=about 165°−about 135°=about 30°) assuming that I represents the intensity (amplitude) of the light, for example. The image display 1 introduces the planar images S1 of the display panel 5 corresponding to the polarization control areas 8b into the left and right eyes 20a and 20b of the observer 20 due to the light emitted from the polarizing plate 10 through the polarization control areas 8b.

As hereinabove described, the image display 1 introduces the planar images S1 into the left and right eyes 20a and 20b of the observer 20, whereby the observer 20 can observe the planar images S1.

(Planar Image Display Mode in Lateral Arrangement)

Figure 12:
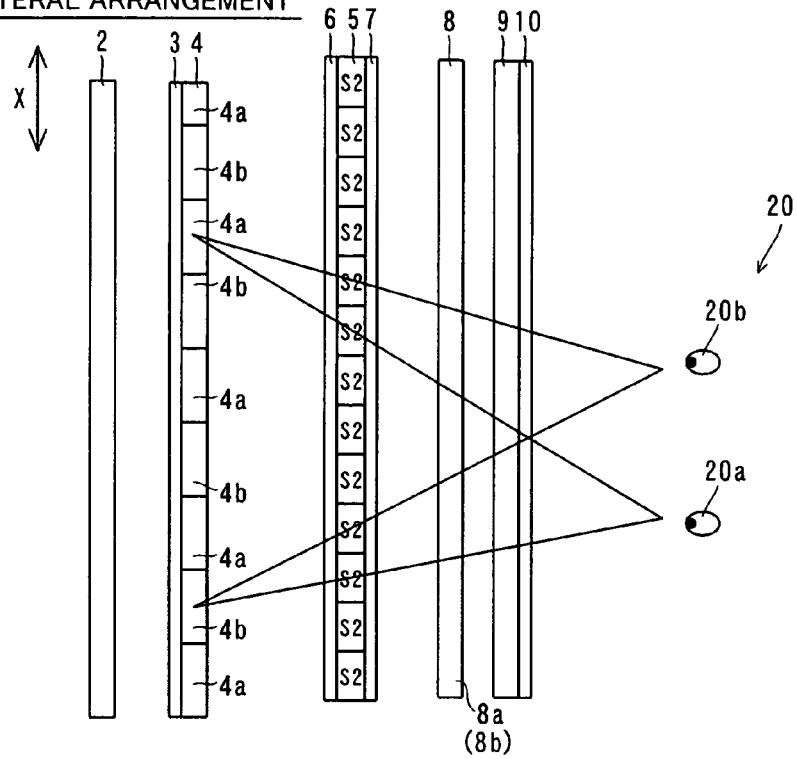
FIG. 12 illustrates the display panel 5 of the image display according to the embodiment of the present invention shown in FIG. 1 in a state laterally arranged for displaying planar images and observed by the observer from above.

A planar image display method in the lateral arrangement of the display panel 5 according to the embodiment of the present invention is now described with reference to FIGS. 4, 11 and 12.

When receiving light irradiated by the backlight 2 (see FIG. 12), the polarizing plate 3 transmits only light having a polarization axis of about 135° as viewed from the observer 20 (see FIG. 12), as shown in FIG. 11. The polarization control areas 4a and 4b of the lateral liquid crystal panel 4 transmit the light having the polarization axis of about 135° as viewed from the observer 20. At this time, the image display 1 applies voltage to the electrodes 4c (see FIG. 4) of the polarization control areas 4a and 4b of the lateral liquid crystal panel 4 in order to control the same to ON-states, thereby invalidating the polarization axes of the polarization control areas 4a and 4b of the lateral liquid crystal panel 4. Thus, the polarization control areas 4a and 4b of the lateral liquid crystal panel 4 transmit the received light without changing the polarization axis thereof, as shown in FIG. 11. Thereafter the polarizing plate 6 having the polarization axis of about 135° as viewed from the observer 20 transmits the light received from the lateral liquid crystal panel 4. The light emitted from the polarizing plate 6 enters the dot areas 5a to 5c and 5e to 5g of the display panel 5. In this case, the display panel 5 displays planar images S2 (see FIG. 12) on all dot areas 5a to 5c and 5e to 5g (see FIG. 12). The display panel 5 emits the light incident upon the same while changing the polarization axis thereof by 90°. In other words, the display panel 5 emits the light transmitted therethrough while changing the polarization axis thereof to about 45° as viewed from the observer 20. The polarizing plate 7 having the polarization axis of about 45° as viewed from the observer 20 transmits the light received from the display panel 5. The light transmitted through the polarizing plate 7 enters the polarization control areas 8a or 8b of the retardation plate 8.

The polarization control areas 8a of the retardation plate 8 transmit the light, having the polarization axis of about 45° as viewed from the observer 20 (see FIG. 12) according to this embodiment, incident upon the same while changing the polarization axis thereof to that line-symmetrical with respect to the polarization axis of about 75° of the polarization control areas 8a of the retardation plate 8. In other words, the light emitted from the polarization control areas 8a has a polarization axis of about 105° as viewed from the observer 20. The image display 1 controls the vertical liquid crystal panel 9 to an ON-state, thereby invalidating the polarization axis of the vertical liquid crystal panel 9. Thus, the vertical liquid crystal panel 9 emits the light incident upon the same without changing the polarization axis thereof. In other words, the light emitted from the vertical liquid crystal panel 9 has a polarization axis of about 105° as viewed from the observer 20. Thereafter the polarizing plate 10 emits the light received from the vertical liquid crystal panel 9 while changing the polarization axis thereof to that of about 135° as viewed from the observer 20 with the intensity (amplitude) of H×(cos θ4)$^2$ (θ4=about 135°−about 105°=about 30°) assuming that H represents the intensity (amplitude) of the light, for example. The image display 1 introduces the planar images S2 of the display panel 5 corresponding to the polarization control areas 8a into the left and right eyes 20a and 20b of the observer 20 due to the light emitted from the polarizing plate 10 through the polarization control areas 8a.

On the other hand, the polarization control areas 8b of the retardation plate 8 transmit the light incident upon the same while changing the polarization axis thereof to that line-symmetrical with respect to the polarization axis of about 15° of the polarization control areas 8b of the retardation plate 8, as shown in FIG. 11. In other words, the light emitted from the polarization control areas 8b has a polarization axis of about 165° as viewed from the observer 20 (see FIG. 12). The image display 1 controls the vertical liquid crystal panel 9 to an ON-state, thereby invalidating the polarization axis of the vertical liquid crystal panel 9. Thus, the vertical liquid crystal panel 9 emits the light without changing the polarization axis thereof. In other words, the light emitted from the vertical liquid crystal panel 9 has a polarization axis of about 165° as viewed from the observer 20. Thereafter the polarizing plate 10 emits the light received from the vertical liquid crystal panel 9 while changing the polarization axis thereof to that of about 135° as viewed from the observer 20 with the intensity (amplitude) of I×(cos θ5)$^2$ (θ5=about 165°−about 135°=about 30°) assuming that I represents the intensity (amplitude) of the light, for example. The image display 1 introduces the planar images S2 of the display panel 5 corresponding to the polarization control areas 8b into the left and right eyes 20a and 20b of the observer 20 due to the light emitted from the polarizing plate 10 through the polarization control areas 8b.

As hereinabove described, the image display 1 introduces the planar images S2 into the left and right eyes 20a and 20b of the observer 20, whereby the observer 20 can observe the planar images S2.

(Effects of the Embodiment)

According to this embodiment, as hereinabove described, the image display 1 provided with the vertical retardation plate 8 and the lateral liquid crystal panel 4 can provide stereoscopic images to the observer 20 in both cases of vertically and laterally arranging the display panel 5 by introducing the left- and right-eye images L1 and R1 into the left and right eyes 20a and 20b of the observer 20 respectively with light transmitted through the polarization control areas 8b of the retardation plate 8 when vertically arranging the display panel 5 and introducing the left- and right-eye images L2 and R2 into the left and right eyes 20a and 20b of the observer 20 respectively with light transmitted through the polarization control areas 4b of the lateral liquid crystal panel 4 when laterally arranging the display panel 5.

According to this embodiment, the retardation plate 8 is provided with the plurality of polarization control areas 8a and the plurality of polarization control areas 8b arranged in the form of a hound's tooth check when the display panel 5 is vertically arranged, whereby the image display 1, capable of advancing light transmitted through the polarization control areas 8b toward the left and right eyes 20a and 20b of the observer 20 in a state substantially uniformly dispersed in the vertical and lateral directions through the obliquely extending polarization control areas 8a and 8b arranged in the form of a hound's tooth check, can disperse reduction of resolution of the left- and right-eye images L1 and R1 of the display panel 5 in the vertical and lateral directions. Thus, the image display 1 can provide stereoscopic images having small image deterioration to the observer 20.

According to this embodiment, the polarization control areas 8a and 8b of the retardation plate 8 are arranged for the respective ones of the dot areas 5a to 5c and 5e to 5g so that the image display 1 can introduce the left- and right-eye images L1 and R1 of the display panel 5 into the left and right eyes 20a and 20b of the observer 20 in a subdivided state through the polarization control areas 8a and 8b provided for the respective ones of the dot areas 5a to 5c and 5e to 5g. Thus, the image display 1 can provide stereoscopic images having smaller image deterioration to the observer 20.

According to this embodiment, the display panel 5 is provided with the dot areas 5a to 5c and 5e to 5g for displaying the three primary colors of light, which in turn are arranged to be adjacent to each other substantially perpendicularly to the direction connecting the left and right eyes 20a and 20b of the observer 20 with each other while the display panel 5 is laterally arranged so that the dot areas 5a to 5c and 5e to 5g for displaying the three primary colors of light can be arranged to correspond to the polarization control areas 4a and 4b provided to extend substantially perpendicularly to the direction connecting the left and right eyes 20a and 20b of the observer 20 with each other, whereby the image display 1 can provide stereoscopic images having smaller image deterioration as compared with a case of arranging only dot areas 5a to 5c an 5e to 5g displaying a prescribed primary color on the polarization control areas 4a and 4b.

Figure 13:
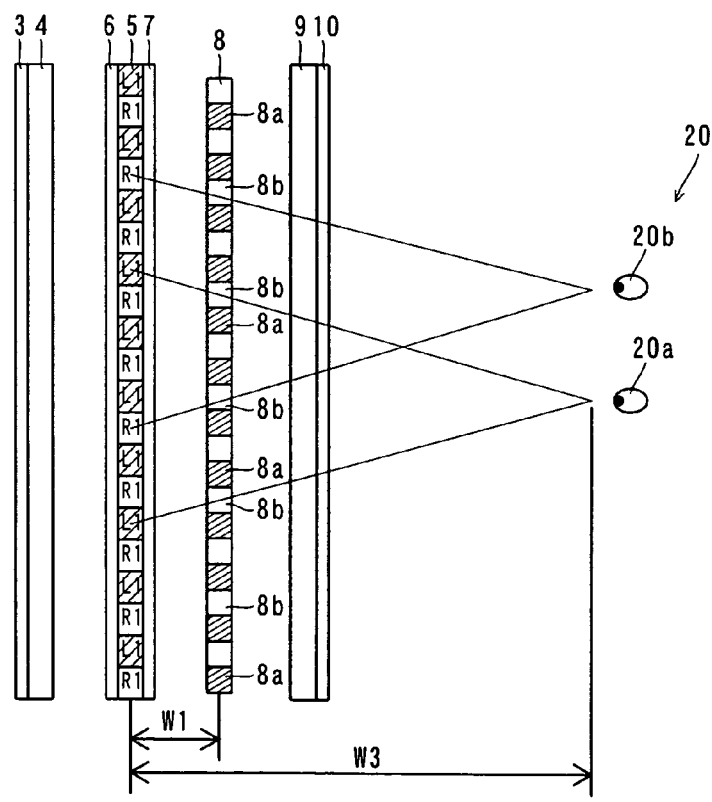
FIGS. 13 and 14 are diagrams for illustrating effects of the image display according to the embodiment of the present invention shown in FIG. 1.
Figure 14:
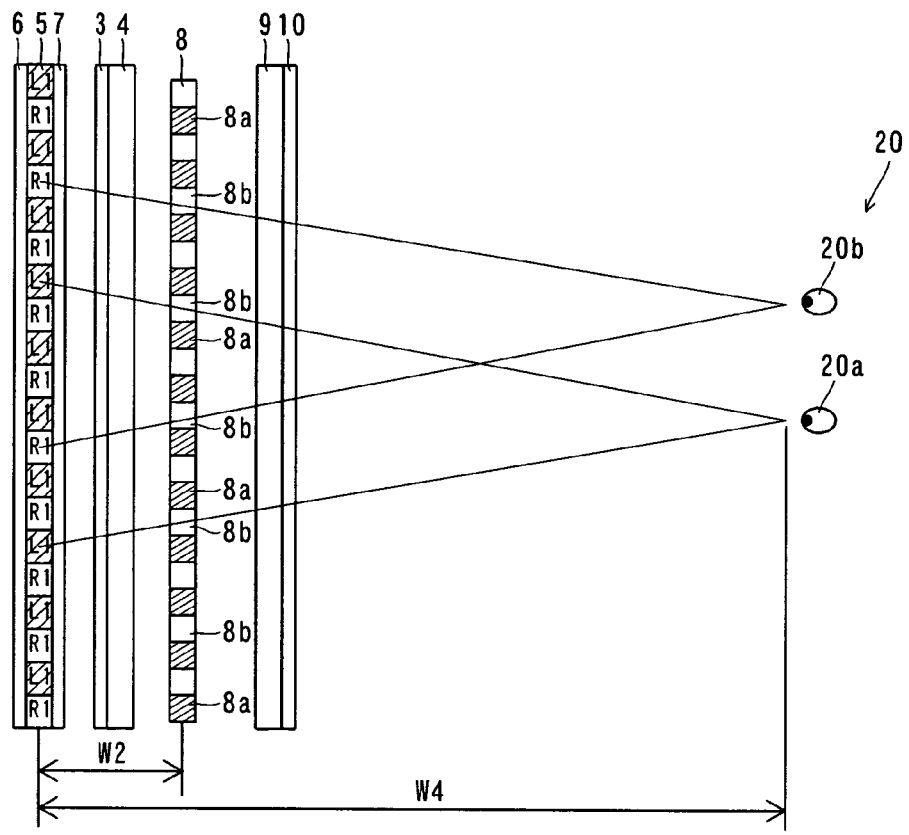

According to this embodiment, the retardation plate 8 and the lateral liquid crystal panel 4 are arranged to hold the display panel 5 therebetween so that the interval W1 (see FIG. 13) between the display panel 5 and the retardation plate 8 can be reduced as compared with the interval W2 between the display panel 5 and the retardation plate 8 in a case of arranging the display panel 5 and the retardation plate 8 to hold the lateral liquid crystal panel 4 therebetween as shown in FIG. 14, for example, whereby the proper visual range W3 (see FIG. 13) with reference to the display panel 5 can be reduced as compared with a proper visual range W4 (see FIG. 14) with reference to the display panel 5 in the case of arranging the display panel 5 and the retardation plate 8 to hold the lateral liquid crystal panel 4 therebetween. Thus, the image display 1, capable of reducing the distance between the display panel 5 and the left and right eyes 20a and 20b of the observer 20 when applied to a portable telephone or the like having a small display panel 5, for example, can render the stereoscopic images displayed on the display panel 5 easy to observe.

Although the present invention has been described and illustrated in detail, it is clearly understood that the same is by way of illustration and example only and is not to be taken by way of limitation, the spirit and scope of the present invention being limited only by the terms of the appended claims.

For example, while the polarization control areas 8a and 8b of the retardation plate 8 are provided in correspondence to the respective dot areas 5a to 5c and 5e to 5g and the width of the polarization control areas 4a and 4b of the lateral liquid crystal panel 4 is set in correspondence to that of the dot areas 5a to 5c and 5e to 5g in the aforementioned embodiment, the present invention is not restricted to this but the polarization control areas 8a and 8b of the retardation plate 8 may alternatively be provided in correspondence to the respective pixel areas 5d, for example, and the width of the polarization control areas 4a and 4b of the lateral liquid crystal panel 4 may alternatively be set in correspondence to that of the plurality of dot areas 5a to 5c and 5e to 5g.

While the polarization control areas 8a and 8b of the retardation plate 8 are arranged in the form of a hound's tooth check as exemplary stepwise arrangement in the aforementioned embodiment, the present invention is not restricted to this but the polarization control areas 8a and 8b of the retardation plate 8 may alternatively be arranged to extend in a prescribed direction (direction Y in FIG. 7) or provided in stepwise arrangement other than that in the form of a hound's tooth check. In order to provide stereoscopic images to a plurality of observers in the aforementioned embodiment, the polarization control areas 8a and 8b of the retardation plate 8 may be provided in stepwise arrangement other than that in the form of a hound's tooth check.

While the polarization control areas 4a and 4b of the lateral liquid crystal panel 4 are arranged to extend in the prescribed direction in the aforementioned embodiment, the present invention is not restricted to this but the polarization control areas 4a and 4b of the lateral liquid crystal panel 4 may alternatively be arranged in the form of a hound's tooth check, similarly to the polarization control areas 8a and 8b of the retardation plate 8.

Figure 15:
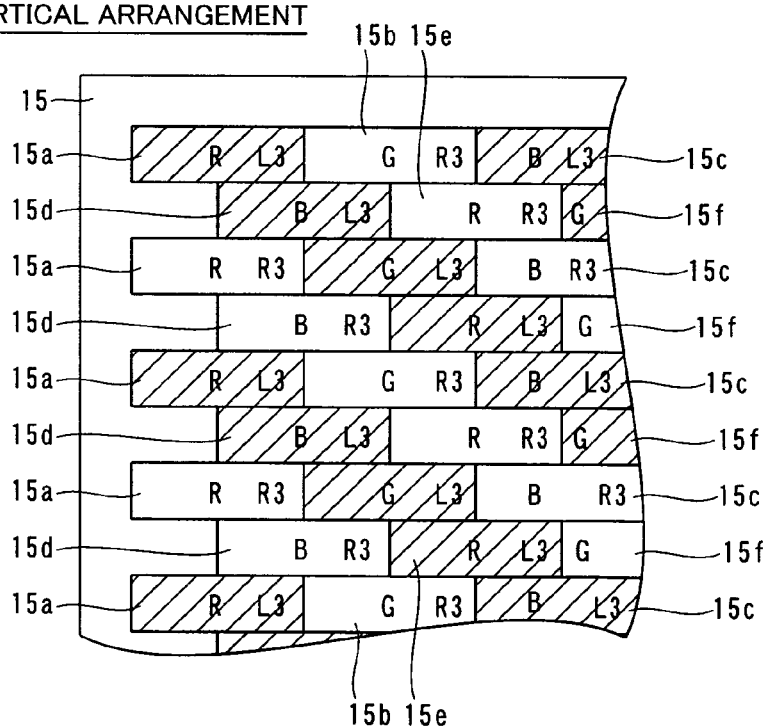
FIG. 15 illustrates a display panel of an image display according to a modification of the embodiment of the present invention shown in FIG. 1.
Figure 16:
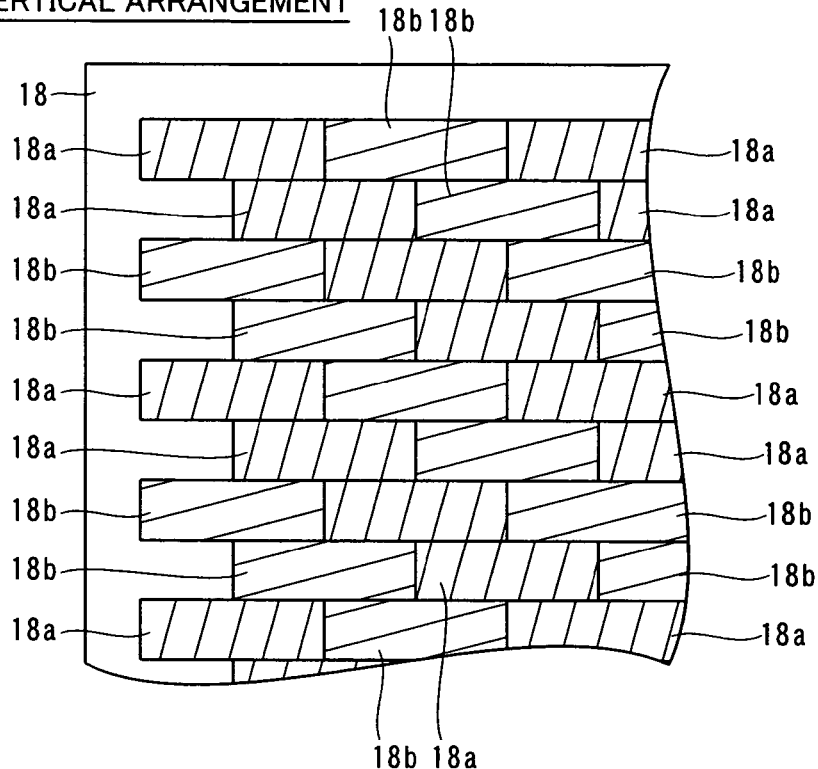
FIG. 16 illustrates a retardation plate of the image display according to the modification of the embodiment of the present invention shown in FIG. 1.
Figure 17:
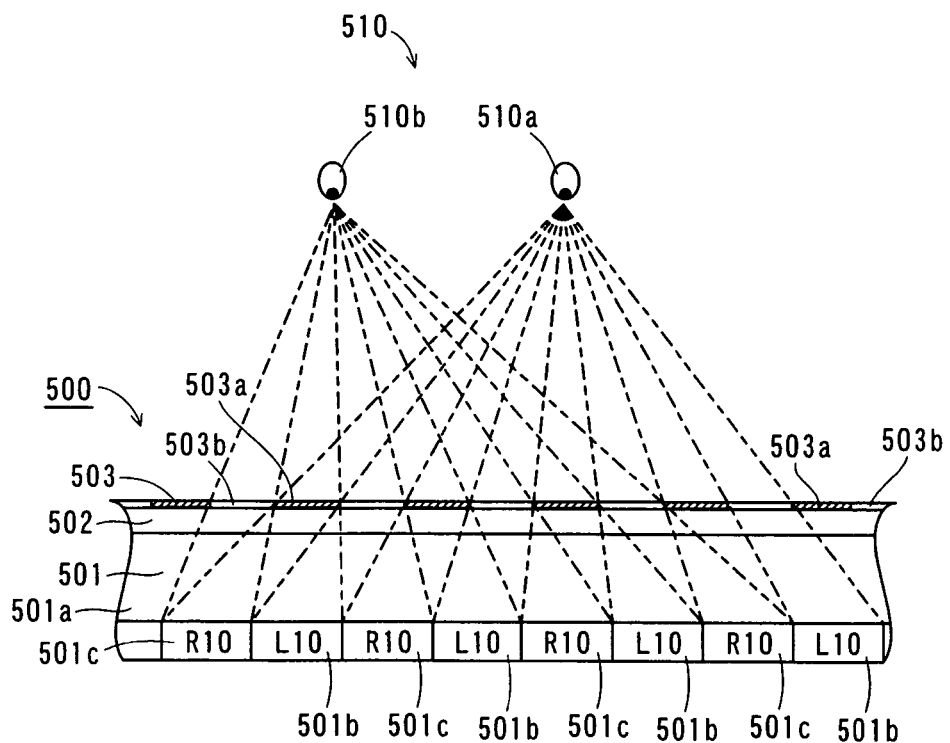
FIG. 17 is a plan view for illustrating the principle of an exemplary conventional stereoscopic image display.

While the dot areas 5a to 5c and 5e to 5g of the display panel 5 are linearly arranged in the vertical and lateral directions in the aforementioned embodiment, the present invention is not restricted to this but dot areas 15a to 15c and 15d to 15f of a display panel 15 may be laterally linearly arranged in a zigzag manner along the vertical direction as in a modification of the embodiment of the present invention shown in FIG. 15. In this case, polarization control areas 18a and 18b of a retardation plate 18 may be arranged to correspond to the dot areas 15a to 15f of the display panel 15, as shown in FIG. 16. In order to display stereoscopic images in a vertically arranged state, for example, the display panel 15 may display left- and right-eye images L3 and R3 on hatched (slanted) and unhatched areas shown in FIG. 15 respectively. In this case, the polarization control areas 18a and 18b shown in FIG. 16 may be arranged to correspond to the left- and right-eye images L3 and R3 shown in FIG. 15 respectively.

While the polarizing plates 6 and 7 arranged to hold the display panel 5 therebetween have polarization axes perpendicular to each other according to a TN (twisted nematic) system in the aforementioned embodiment, the present invention is not restricted to this but another system such as a VA (vertical alignment) or ECB (electrically controlled birefringence) system, for example may alternatively be employed. When the VA system is employed, for example, the polarizing plates 6 and 7 arranged to hold the display panel 5 therebetween may have the same polarization axes, and the polarization axes of the polarizing plate 3, the lateral liquid crystal panel 4, the retardation plate 8, the vertical liquid crystal panel 9 and the polarizing plate 10 may be set to correspond to those of the polarizing plates 6 and 7.

While the polarization axes of the polarizing plates 3, 6, 7 and 10, the lateral liquid crystal panel 4, the polarization control areas 8a and 8b of the retardation plate 8 and the vertical liquid crystal panel 9 are set to about 135°, about 135°, about 45°, about 135°, the horizontal direction (about 0°), about 75°, about 15° and about 165° respectively in the aforementioned embodiment, the present invention is not restricted to this but the polarization axes of the polarizing plates 3, 6, 7 and 10, the lateral liquid crystal panel 4, the polarization control areas 8a and 8b of the retardation plate 8 and the vertical liquid crystal panel 9 may alternatively set to other values respectively.

What is claimed is:

1. An image display comprising:
a display panel for displaying images;
a light source for applying light toward said display panel;
first polarization axis control means for separating said light irradiated from said light source into light having a first polarization axis and another light having a second polarization axis; and
second polarization axis control means for separating said light irradiated from said light source into still another light having a third polarization axis and further light having a fourth polarization axis,
for providing a stereoscopic image to an observer by advancing either said light having said first polarization axis or said light having said second polarization axis toward the eyes of said observer while arranging a prescribed reference side of said display panel in a first direction, and providing another stereoscopic image to said observer by advancing either said light having said third polarization axis or said light having said fourth polarization axis toward the eyes of said observer while arranging said prescribed reference side of said display panel in a second direction intersecting with said first direction.

2. The image display according to claim 1, providing a stereoscopic image to said observer by advancing a left-eye image toward the left eye of said observer and advancing a right-eye image toward the right eye of said observer with either said light having said first polarization axis or said light having said second polarization axis while arranging said prescribed reference side of said display panel in said first direction, and providing another stereoscopic image to said observer by advancing said left-eye image toward the left eye of said observer and advancing said right-eye image toward the right eye of said observer with either said light having said third polarization axis or said light having said fourth polarization axis while arranging said prescribed reference side of said display panel in said second direction intersecting with said first direction.

3. The image display according to claim 1, wherein said first polarization axis control means includes a plurality of first polarization control areas for controlling said light irradiated from said light source to said light having said first polarization axis and a plurality of second polarization control areas for controlling said light irradiated from said light source to said light having said second polarization axis, and said plurality of first polarization control areas and said plurality of second polarization areas are arranged to extend along a third direction intersecting with both of said first direction and said second direction while said prescribed reference side of said display panel is arranged in said first direction.

4. The image display according to claim 3, wherein said plurality of first polarization control areas and said plurality of second polarization areas are arranged stepwise while said prescribed reference side of said display panel is arranged in said first direction.

5. The image display according to claim 3, wherein said display panel includes a plurality of dot areas for displaying the three primary colors of light, and said first polarization control areas and said second polarization control areas of said first polarization axis control means are arranged for respective said dot areas of said display panel.

6. The image display according to claim 1, wherein said first polarization axis control means includes a retardation plate.

7. The image display according to claim 1, wherein said second polarization axis control means includes a plurality of third polarization control areas for controlling said light irradiated from said light source to said light having said third polarization axis and a plurality of fourth polarization control areas for controlling said light irradiated from said light source to said light having said fourth polarization axis, and said third polarization control areas and said fourth polarization control areas are alternately arranged in a direction along a direction connecting the left and right eyes of said observer with each other to extend substantially perpendicularly to said direction connecting the left and right eyes of said observer with each other while said prescribed reference side of said display panel is arranged in said second direction.

8. The display according to claim 7, wherein said display panel includes three types of dot areas for displaying the three primary colors of light respectively, the lengths of said third polarization control areas and said fourth polarization control areas of said second polarization axis control means in said direction along said direction connecting the left and right eyes of said observer with each other are set to substantially correspond to the lengths of said dot areas in said direction along said direction connecting the left and right eyes of said observer with each other, and said three types of dot areas of said display panel for displaying the three primary colors of light respectively are adjacently arranged substantially perpendicularly to said direction connecting the left and right eyes of said observer with each other while said display panel is arranged in said second direction.

9. The image display according to claim 7, wherein said second polarization axis control means includes a first polarization control liquid crystal panel having said third polarization control areas and said fourth polarization control areas, and said third polarization control areas and said fourth polarization control areas of said first polarization control liquid crystal panel are formed with electrodes for applying voltage to liquid crystals, to extend in the same direction as said third polarization control areas and said fourth polarization control areas respectively.

10. The image display according to claim 1, further comprising third polarization axis control means controlling said light having said first polarization axis to light having a fifth polarization axis and controlling said light having said second polarization axis to another light having a sixth polarization axis while said prescribed reference side of said display panel is arranged in said first direction and transmitting said light having said first polarization axis and said light having said second polarization axis without controlling said polarization axis while said prescribed reference side of said display panel is arranged in said second direction.

11. The image display according to claim 10, wherein said third polarization axis control means includes a second polarization control liquid crystal panel capable of switching a first state of controlling said light having said first polarization axis to said light having said fifth polarization axis while controlling said light having said second polarization axis to said light having said sixth polarization axis and a second state of transmitting said light having said first polarization axis and said light having said second polarization axis without controlling said polarization axis.

12. The image display according to claim 11, wherein said second polarization control liquid crystal panel switches said first state and said second state by controlling a voltage application state.

13. The image display according to claim 10, wherein said third polarization axis control means is arranged between said first polarization axis control means and said observer.

14. The image display according to claim 10, further comprising a first polarizing plate arranged between said third polarization axis control means and said observer for blocking either said light having said fifth polarization axis or said light having said sixth polarization axis controlled by said third polarization axis control means.

15. The image display according to claim 1, wherein
said first polarization axis control means and said second polarization axis control means are arranged to hold said display panel therebetween.

16. The image display according to claim 1, further comprising a second polarizing plate arranged between said second polarization axis control means and said display panel for blocking either said light having said third polarization axis or said light having said fourth polarization axis separated by said second polarization axis control means.

17. The image display according to claim 1, further comprising a third polarizing plate arranged between said light source and said second polarization axis control means for transmitting only light, having a prescribed polarization axis, included in said light irradiated from said light source.

18. The image display according to claim 1, further comprising third polarization axis control means controlling said light having said first polarization axis to light having a fifth polarization axis while controlling said light having said second polarization axis to another light having a sixth polarization axis, wherein
said second polarization axis control means is switchable between a case of advancing either said light having said third polarization axis or said light having said fourth polarization axis toward the eyes of said observer and another case of advancing both of said light having said third polarization axis and said light having said fourth polarization axis toward the eyes of said observers,
said third polarization axis control means is switchable between a case of advancing either said light having said fifth polarization axis or said light having said sixth polarization axis toward the eyes of said observer and another case of advancing both of said light having said fifth polarization axis and said light having said sixth polarization axis toward the eyes of said observer, and
said second polarization axis control means advances both of said light having said third polarization axis and said light having said fourth polarization axis toward the eyes of said observer and said third polarization axis control means advances both of said light having said fifth polarization axis and said light having said sixth polarization axis toward the eyes of said observer, thereby providing a planar image to said observer.

* * * * *